(12) United States Patent
Tanaka et al.

(10) Patent No.: US 12,537,228 B2
(45) Date of Patent: Jan. 27, 2026

(54) LAMINATED ALL-SOLID SECONDARY CELL AND METHOD FOR MANUFACTURING SAME

(71) Applicant: TDK CORPORATION, Tokyo (JP)

(72) Inventors: Kazumasa Tanaka, Tokyo (JP); Masayuki Muroi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 845 days.

(21) Appl. No.: 17/431,198

(22) PCT Filed: Mar. 12, 2020

(86) PCT No.: PCT/JP2020/010758
§ 371 (c)(1),
(2) Date: Aug. 16, 2021

(87) PCT Pub. No.: WO2020/184652
PCT Pub. Date: Sep. 17, 2020

(65) Prior Publication Data
US 2022/0140400 A1    May 5, 2022

(30) Foreign Application Priority Data

Mar. 12, 2019 (JP) ................................ 2019-045032
Mar. 12, 2019 (JP) ................................ 2019-045035

(51) Int. Cl.
*H01M 10/0585* (2010.01)
*H01M 10/0562* (2010.01)
(Continued)

(52) U.S. Cl.
CPC ... *H01M 10/0585* (2013.01); *H01M 10/0562* (2013.01); *H01M 50/528* (2021.01); *H01M 50/547* (2021.01); *H01M 2300/0071* (2013.01)

(58) Field of Classification Search
CPC ......... H01M 10/0585; H01M 10/0562; H01M 10/058; H01M 50/528; H01M 50/547;
(Continued)

(56) References Cited

U.S. PATENT DOCUMENTS

| 5,295,289 A | 3/1994 | Inagaki et al. |
| 2007/0042265 A1 | 2/2007 | Tamai et al. |
| 2013/0149593 A1 | 6/2013 | Hayashi et al. |

FOREIGN PATENT DOCUMENTS

| JP | H03-225904 A | 10/1991 |
| JP | H05-101996 A | 4/1993 |

(Continued)

OTHER PUBLICATIONS

English translation of CN 114695940, China, 2022.*

(Continued)

*Primary Examiner* — Holly Rickman
(74) *Attorney, Agent, or Firm* — Oliff PLC

(57) ABSTRACT

A laminated all-solid-state secondary battery including: a laminated body in which a positive electrode and a negative electrode are laminated with a solid electrolyte layer interposed therebetween and which includes a side surface including a first side surface exposing the positive electrode current collector layer and a second side surface exposing the negative electrode current collector layer; an outer positive electrode attached to the first side surface; and an outer negative electrode attached to the second side surface, wherein the outer positive electrode is electrically connected to the positive electrode current collector layer, a side end portion of the outer positive electrode is located at a position not facing the negative electrode, the outer negative electrode is electrically connected to the negative electrode (Continued)

current collector layer, and a side end portion of the outer negative electrode is located at a position not facing the positive electrode.

8 Claims, 20 Drawing Sheets

(51) Int. Cl.
*H01M 50/528* (2021.01)
*H01M 50/547* (2021.01)

(58) Field of Classification Search
CPC ....... H01M 50/552; H01M 2300/0071; H01M 2300/0068
See application file for complete search history.

(56) References Cited

FOREIGN PATENT DOCUMENTS

| JP | H06-231796 A | 8/1994 |
|----|--------------|--------|
| JP | 2004-095200 A | 3/2004 |
| JP | 2011-146202 A | 7/2011 |
| JP | 2011-198692 A | 10/2011 |
| JP | 2012-226862 A | 11/2012 |
| JP | 2014-192041 A | 10/2014 |
| JP | 2015-011864 A | 1/2015 |
| JP | 2015-069775 A | 4/2015 |
| JP | 2016-001602 A | 1/2016 |
| JP | 2019-204911 A | 11/2019 |
| WO | 2012/020699 A1 | 2/2012 |

OTHER PUBLICATIONS

Translation of Mar. 19, 2024 Office Action issued in Japanese Application No. 2021-505123.
Translation of Jun. 21, 2023 Office Action issued in Chinese Patent Application No. 202080014897.7.
Jun. 9, 2020 International Search Report issued in International patent Application No. PCT/JP2020/010758.

* cited by examiner

FIG. 11 —Prior Art—
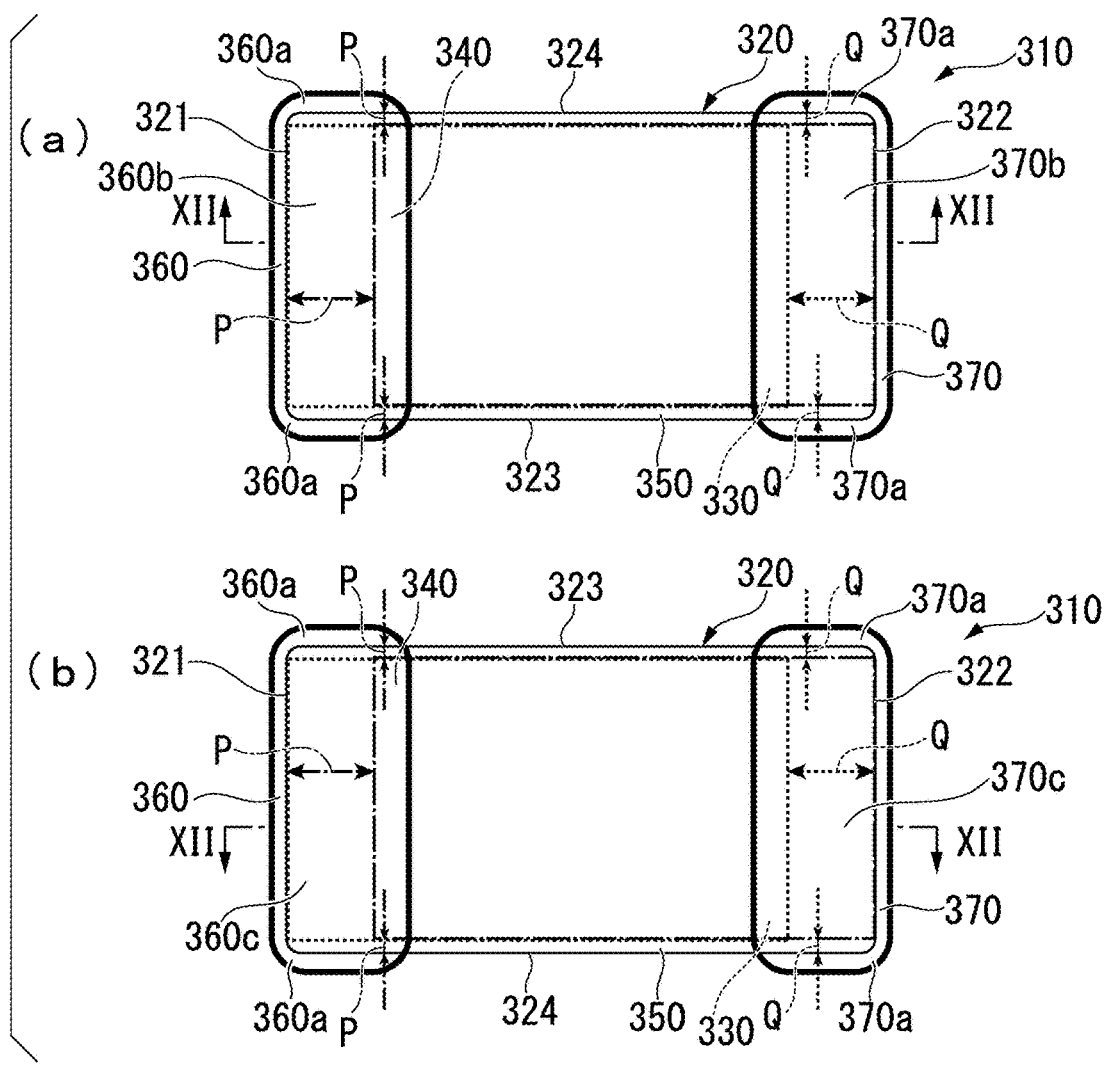
FIG. 12 —Prior Art—
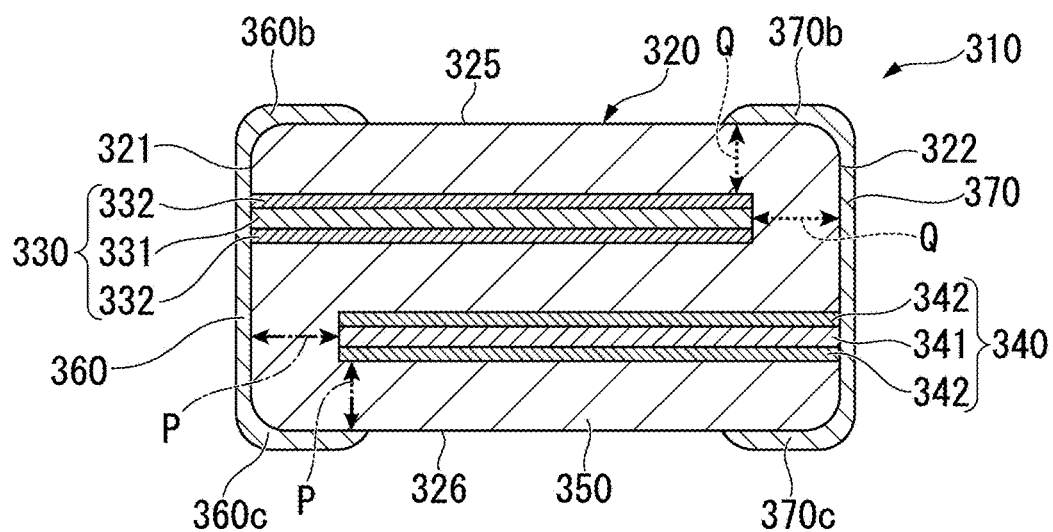

—Prior Art—

—Prior Art—

LAMINATED ALL-SOLID SECONDARY CELL AND METHOD FOR MANUFACTURING SAME

TECHNICAL FIELD

The present invention relates to a laminated all-solid-state secondary battery and method for manufacturing the same.

Priority is claimed on Japanese Patent Application No. 2019-045032 filed on Mar. 12, 2019 and Japanese Patent Application No. 2019-045035 filed on Mar. 12, 2019, the content of which is incorporated herein by reference.

BACKGROUND ART

In recent years, electronics technologies have been remarkably developed and portable electronic devices have been made smaller, lighter, thinner, and more multifunctional. Accordingly, there has been a strong demand for cells that are power sources for electronic devices to be smaller, lighter, thinner, and more reliable and an all-solid lithium ion secondary battery that uses solid electrolyte as electrolyte has gained attention.

As the all-solid lithium ion secondary battery, a laminated all-solid lithium ion secondary battery (hereinafter, reoffered to as a laminated all-solid-state secondary battery) in which a positive electrode including a positive electrode current collector layer and a positive electrode active material layer; and a negative electrode including a negative electrode current collector layer and a negative electrode active material layer are alternately laminated with a solid electrolyte layer interposed therebetween is known.

Further, a sintered laminated all-solid lithium ion secondary battery (hereinafter, referred to as a laminated all-solid-state secondary battery) in which a positive electrode and a negative electrode are alternately laminated with a solid electrolyte layer interposed therebetween is known.

In a general laminated all-solid-state secondary battery, a positive electrode current collector layer and a negative electrode current collector layer are exposed to a side surface of a laminated body and the side surface of the laminated body is provided with an outer positive electrode electrically connected to the positive electrode current collector layer and an outer negative electrode electrically connected to the negative electrode current collector layer (Patent Literature 1). Patent Literature 1 discloses the laminated all-solid-state secondary battery in which an end portion of the outer positive electrode is located at a position facing the negative electrode and an end portion of the outer negative electrode is located at a position facing the positive electrode.

Further, in another general laminated all-solid-state secondary battery, a positive electrode current collector layer and a negative electrode current collector layer are exposed to a side surface of a laminated sintered body and the side surface of the laminated body is provided with an outer positive electrode electrically connected to the positive electrode current collector layer and an outer negative electrode electrically connected to the negative electrode current collector layer (Patent Literature 2). In general, this laminated all-solid-state secondary battery is manufactured as below. First, a laminated body is obtained by laminating a positive electrode and a negative electrode with a solid electrolyte layer interposed therebetween. Next, a laminated sintered body is obtained by baking and sintering the obtained laminated body. Then, a conductive material paste is applied to the side surface of the obtained laminated sintered body according to a dip coating method or a printing method and is heated to form an outer positive electrode and an outer negative electrode (Patent Literature 3).

CITATION LIST

Patent Literature

[Patent Literature 1]
   Japanese Unexamined Patent Application, First Publication No. 2015-11864
[Patent Literature 2]
   Japanese Unexamined Patent Application, First Publication No. 2014-192041
[Patent Literature 3]
   Japanese Unexamined Patent Application, First Publication No. 2011-146202

SUMMARY OF INVENTION

Technical Problem

By the way, in the laminated all-solid-state secondary battery, it is required to have a function of improving the charge and discharge capacity and instantaneously continuously discharging a large current, that is, a function of improving the pulse discharge cycle characteristics with the recent increase in the output of electronic devices. However, the conventional laminated all-solid-state secondary battery has a problem that both the charge and discharge capacity and the pulse discharge cycle characteristics cannot be improved.

The present invention has been made in view of the above-described circumstances and an object of the present invention is to provide a laminated all-solid-state secondary battery having excellent charge and discharge capacity and pulse discharge cycle characteristic.

Further, it is required to improve the charge and discharge capacity and the volumetric energy density in the laminated all-solid-state secondary battery with the recent miniaturization of electronic devices. However, since the laminated all-solid-state secondary battery has a configuration in which the surface of the laminated body is provided with the outer electrode for drawing the positive electrode and the negative electrode to the outside, there is a problem that the volume becomes large and the volumetric energy density becomes small if the outer electrode is provided.

Further, in the laminated sintered body which is obtained at the time of manufacturing the laminated all-solid-state secondary battery, the positive and negative electrode current collector layers contract and the exposure to the side surface may be insufficient. Therefore, since the bondability between the current collector layer and the outer electrode is poor when the outer electrode is applied to the side surface of the laminated sintered body, there is a problem that an excellent charge and discharge capacity cannot be obtained. Furthermore, since a crack is likely to be generated in the bonding surface between the current collector layer and the outer electrode due to the expansion and contraction of the volume with the charge and discharge reaction, there is a problem that excellent cycle characteristics cannot be obtained.

The present invention has been made in view of the above-described circumstances and an object of the present invention is to provide a laminated all-solid-state secondary battery having excellent charge and discharge capacity, volumetric energy density, and cycle characteristics and a method for manufacturing the same.

Solution to Problem

The present inventors have carried out careful examination in order to solve the above-described problems and have found that the charge and discharge capacity and the pulse discharge cycle characteristics are improved by the configuration in which the side end portion of the outer positive electrode of the laminated all-solid-state secondary battery is located at a position not facing the side end portion of the negative electrode and the side end portion of the outer negative electrode is located at a position not facing the side end portion of the positive electrode. The reason for this is not always clear, but it is considered that the generation of the parasitic capacitance (stray capacitance) between the outer positive electrode and the negative electrode or between the outer negative electrode and the positive electrode is suppressed. The parasitic capacitance means a capacitance component not intended by a designer due to the internal physical structure of the electronic component.

That is, the present invention provides the following means in order to solve the above-described problems.
(1) A laminated all-solid-state secondary battery according to a first aspect of the present invention includes: a laminated body in which a positive electrode including a positive electrode current collector layer and a positive electrode active material layer; and a negative electrode including a negative electrode current collector layer and a negative electrode active material layer are laminated with a solid electrolyte layer interposed therebetween and which includes a side surface formed as a surface parallel to a laminating direction, the side surface including a first side surface exposing the positive electrode current collector layer and a second side surface exposing the negative electrode current collector layer; an outer positive electrode which is attached to the first side surface; and an outer negative electrode which is attached to the second side surface, wherein the outer positive electrode is electrically connected to the positive electrode current collector layer, a side end portion of the outer positive electrode is located at a position not facing the negative electrode, the outer negative electrode is electrically connected to the negative electrode current collector layer, and a side end portion of the outer negative electrode is located at a position not facing the positive electrode.
(2) In the laminated all-solid-state secondary battery according to the aspect (1), the laminated body may include an upper surface and a lower surface which are formed as surfaces orthogonal to the laminating direction and each of the outer positive electrode and the outer negative electrode may include a sub-electrode which extends to at least one surface of the upper surface and the lower surface.
(3) In the laminated all-solid-state secondary battery according to the aspect (2), a front end portion of the sub-electrode of the outer positive electrode may be located at a position not facing a major surface of the negative electrode laminated at a position closest to the sub-electrode in the laminating direction.
(4) In the laminated all-solid-state secondary battery according to the aspect (2), a front end portion of the sub-electrode of the outer negative electrode may be located at a position not facing a major surface of the positive electrode laminated at a position closest to the sub-electrode in the laminating direction.
(5) In the laminated all-solid-state secondary battery according to any one of the aspects (1) to (4), the first side surface and the second side surface may be located at a facing position.
(6) In the laminated all-solid-state secondary battery according to the aspect (1), a side surface sub-electrode of the outer positive electrode may be located at a position not facing the side end portion of the negative electrode, the outer negative electrode may be electrically connected to the negative electrode current collector layer, and a side surface sub-electrode of the outer negative electrode may be located at a position not facing the side end portion of the positive electrode.
(7) In the laminated all-solid-state secondary battery according to the aspect (6), the laminated body may include an upper surface and a lower surface which are formed as surfaces orthogonal to the laminating direction and the outer positive electrode and the outer negative electrode may include an upper surface sub-electrode or a lower surface sub-electrode.
(8) In the laminated all-solid-state secondary battery according to the aspect (7), a front end portion of the upper surface sub-electrode or the lower surface sub-electrode of the outer positive electrode may be located at a position not facing a major surface of the negative electrode laminated at a position closest to the upper and lower surface sub-electrodes in the laminating direction.
(9) A front end portion of the upper surface sub-electrode or the lower surface sub-electrode of the outer negative electrode may be located at a position not facing a major surface of the positive electrode laminated at a position closest to the sub-electrode in the laminating direction.
(10) In the laminated all-solid-state secondary battery according to any one of the aspects (6) to (9), the first side surface and the second side surface may be located at a facing position.

Further, the present inventor has carried out careful examination in order to solve the above-described problems and found that the charge and discharge capacity, the volumetric energy density, and the cycle characteristics are improved by forming at least one end portion of the upper end portion and the lower end portion of the outer positive electrode and the outer negative electrode on the inside of the upper end portion or the lower end portion of the laminated body in the laminated all-solid-state secondary battery. The reason for this is not always clear, but the following can be considered.

First, when the positive and outer negative electrodes of the laminated all-solid-state secondary battery are formed on the inside of the laminated body, it is possible to prevent the positive and outer negative electrodes from being formed at the ridge of the laminated body. Thus, the generation of parasitic capacitance (stray capacitance) between the outer positive electrode and the negative electrode at the ridge or between the outer negative electrode and the positive electrode at the ridge is suppressed. Therefore, it is considered that the charge and discharge capacity is improved. Further, the parasitic capacitance means a capacitance component not intended by a designer due to the internal physical structure of the electronic component. Further, since the positive electrode current collector and the negative electrode current collector can be electrically connected to the outer electrodes without increasing the volume of the laminated all-solid-state secondary battery by forming the positive and outer negative electrodes on the inside of the laminated body, it is considered that the volumetric energy density becomes high.

Further, the present inventor forms a groove in the laminated body before baking the laminated body in which the positive electrode and the negative electrode are laminated with the solid electrolyte layer interposed therebetween, that is, at the unbaked stage, exposes the positive electrode current collector and the negative electrode current collector to the side surface of the laminated body, and fills the groove with a conductive material. Next, an unbaked laminated all-solid-state secondary battery in which the conductive material is formed as the outer positive electrode and the outer negative electrode can be manufactured by cutting the groove filled with the conductive material. Thus, it is found that, at the unbaked stage, an unbaked laminated all-solid cell having a good bonded state between the outer positive electrode and the positive electrode current collector and between the outer negative electrode and the negative electrode current collector can be obtained. Thus, since it is possible to obtain good bondability between the outer positive electrode and the positive electrode current collector and between the outer negative electrode and the negative electrode current collector even after the baking even if the laminated body is baked, it is possible to obtain the laminated all-solid-state secondary battery having excellent cycle characteristics.

That is, the present invention provides the following means in order to solve the above-described problems.

(11) A laminated all-solid-state secondary battery according to another aspect of the present invention includes: a laminated sintered body which is obtained by sintering a laminated body, in which a positive electrode including a positive electrode current collector layer and a positive electrode active material layer; and a negative electrode including a negative electrode current collector layer and a negative electrode active material layer are laminated with a solid electrolyte layer interposed therebetween, and includes a side surface formed as a surface parallel to the laminating direction, the side surface including a first side surface exposing the positive electrode current collector layer and a second side surface exposing the negative electrode current collector layer; an outer positive electrode which is attached to the first side surface; and an outer negative electrode which is attached to the second side surface, wherein the outer positive electrode is electrically connected to the positive electrode current collector layer and at least one end portion of an upper end portion and a lower end portion of the outer positive electrode in the laminating direction is located on an inside of an upper end portion or a lower end portion of the laminated sintered body in the laminating direction, and wherein the outer negative electrode is electrically connected to the negative electrode current collector layer and at least one end portion of an upper end portion and a lower end portion of the outer negative electrode in the laminating direction is located on an inside of the upper end portion or the lower end portion of the laminated sintered body in the laminating direction.

(12) In the laminated all-solid-state secondary battery according to the aspect (11), the laminated sintered body may include an upper surface and a lower surface which are formed as surfaces orthogonal to the laminating direction and each of the outer positive electrode and the outer negative electrode may include a sub-electrode which extends to at least one surface of the upper surface and the lower surface.

(13) A method for manufacturing a laminated all-solid-state secondary battery according to another aspect of the present invention includes the steps of: obtaining a unit laminated body by laminating a positive electrode unit in which two or more positive electrodes including a positive electrode current collector layer and a positive electrode active material layer are arranged in parallel with a spacing portion therebetween along a surface direction of the positive electrode and a negative electrode unit in which two or more negative electrodes including a negative electrode current collector layer and a negative electrode active material layer are arranged in parallel with a spacing portion therebetween along a plane direction of the negative electrode so that the spacing portion of the positive electrode unit faces the negative electrode of the negative electrode unit and the spacing portion of the negative electrode unit faces the positive electrode of the positive electrode unit with a solid electrolyte layer interposed therebetween and providing the solid electrolyte layer on both upper and lower surfaces in the laminating direction; providing a first groove passing through the spacing portion of the positive electrode unit and a second groove passing through the spacing portion of the negative electrode unit in the laminating direction from one surface of the unit laminated body in the laminating direction; filling the first groove and the second groove with a conductive material; obtaining a unit laminated body piece by forming a notch penetrating each of the first groove filled with the conductive material and the second groove filled with the conductive material to cut the unit laminated body in the laminating direction; and baking and sintering the unit laminated body piece.

(14) A method for manufacturing a laminated all-solid-state secondary battery according to still another aspect of the present invention includes the steps of: obtaining a unit laminated body by laminating a positive electrode unit in which two or more positive electrodes including a positive electrode current collector layer and a positive electrode active material layer are arranged in parallel with a spacing portion therebetween along a surface direction of the positive electrode and a negative electrode unit in which two or more negative electrodes including a negative electrode current collector layer and a negative electrode active material layer are arranged in parallel with a spacing portion therebetween along a plane direction of the negative electrode so that the spacing portion of the positive electrode unit faces the negative electrode of the negative electrode unit and the spacing portion of the negative electrode unit faces the positive electrode of the positive electrode unit with a solid electrolyte layer interposed therebetween and providing the solid electrolyte layer on one of the upper and lower surfaces in the laminating direction; providing a first groove passing through the spacing portion of the positive electrode unit and a second groove passing through the spacing portion of the negative electrode unit in the laminating direction from a surface on the side opposite to the surface provided with the solid electrolyte layer of the unit laminated body; filling the first groove and the second groove with a conductive material; forming a solid electrolyte layer on a surface on the side opposite to the surface provided with the solid electrolyte layer in the unit laminated body; obtaining a unit laminated body piece by forming a notch penetrating each of the first groove filled with the conductive material and the second groove filled with the conductive material to cut the unit laminated body in the laminating direction; and baking and sintering the unit laminated body piece.

Advantageous Effects of Invention

According to the present invention, it is possible to provide a laminated all-solid-state secondary battery having excellent charge and discharge capacity and pulse discharge cycle characteristics.

Further, it is possible to provide a laminated all-solid-state secondary battery having excellent charge and discharge capacity, volumetric energy density, and cycle characteristics and a method for manufacturing the same.

BRIEF DESCRIPTION OF DRAWINGS

FIG. 1(a) is a plan view when viewed from above and FIG. 1(b) is a bottom view when viewed from below.

FIG. 3(a) is a plan view when viewed from above and FIG. 3(b) is a bottom view when viewed from below.

FIG. 5(b) is a bottom view when viewed from below.

FIG. 6 is a cross-sectional view taken along a line VI-VI of FIG. 5.

FIG. 7(a) is a plan view when viewed from above and FIG. 7(b) is a bottom view when viewed from below.

FIG. 9(a) is a plan view when viewed from above and FIG. 9(b) is a bottom view when viewed from below.

FIG. 11 is a schematic view of a conventional laminated all-solid-state secondary battery, where FIG. 11(a) is a plan view when viewed from above and FIG. 11(b) is a bottom view when viewed from below.

FIG. 12 is a cross-sectional view taken along a line XII-XII of FIG. 11.

FIG. 13(a) is a plan view when viewed from above and FIG. 13(b) is a bottom view when viewed from below.

FIG. 16(a) is a plan view and FIG. 16(b) is a cross-sectional view taken along a line IVb-IVb of FIG. 16(a).

FIG. 17(a) is a plan view and FIG. 17(b) is a cross-sectional view taken along a line Vb-Vb of FIG. 17(a).

FIG. 26(a) is a plan view when viewed from above and FIG. 26(b) is a bottom view when viewed from below.

FIG. 28(a) is a plan view when viewed from above and FIG. 28(b) is a bottom view when viewed from below.

FIG. 30(a) is a plan view when viewed from above and FIG. 30(b) is a bottom view when viewed from below.

FIG. 32(a) is a plan view when viewed from above and FIG. 32(b) is a bottom view when viewed from below.

DESCRIPTION OF EMBODIMENTS

Figure 1:
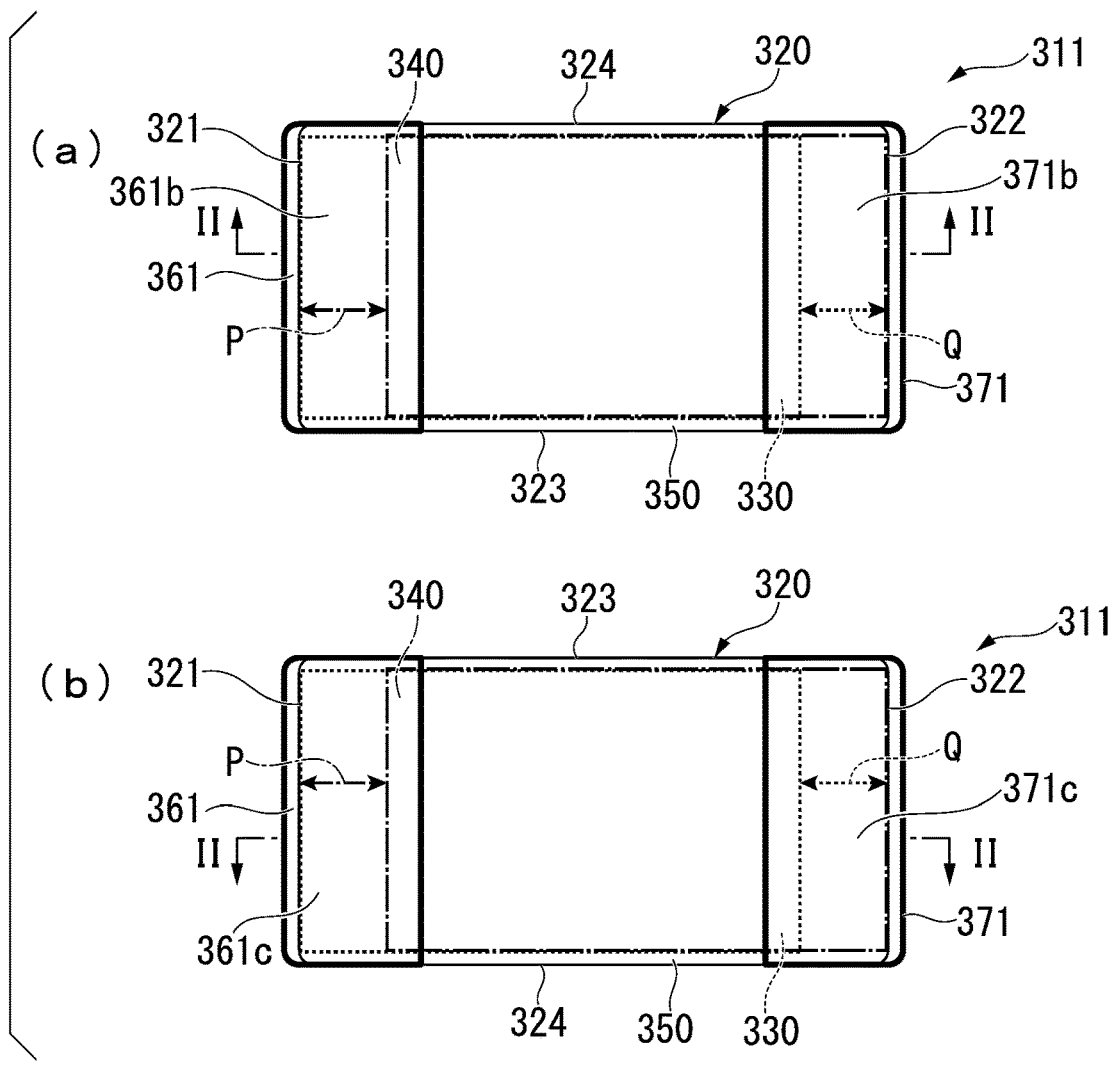
FIG. 1 is a schematic view of a laminated all-solid-state secondary battery according to a first embodiment, where

Hereinafter, the present invention will be described in detail by appropriately referring to the drawings. The drawings used in the following description may be enlarged for convenience in order to make the features of the present invention easy to understand. Thus, the dimensional ratios of each component shown in the drawings may differ from the actual ones. The materials, dimensions, and the like exemplified in the following description are examples and the present invention is not limited thereto. The present invention can be appropriately modified and implemented within the range in which the effect is exhibited.

[Conventional Laminated all-Solid-State Secondary Battery]

First, a conventional laminated all-solid-state secondary battery will be described.

FIG. 11 is a schematic view of the conventional laminated all-solid-state secondary battery, where FIG. 11(a) is a plan view when viewed from above and FIG. 11(b) is a bottom view when viewed from below. FIG. 12 is a cross-sectional view taken along a line XII-XII of FIG. 11.

In all the plan views and bottom views of the laminated all-solid-state secondary battery in the drawings attached to the specification of the present application, a sufficient side margin is provided between the side surface of the positive electrode or the negative electrode and the side surface of the outer wall of the all-solid-state secondary battery to prevent at least a short circuit. Even if they are drawn as if they are in contact with each other in the drawing, the side margin which is very thin as if it cannot be depicted s provided between them.

As shown in FIGS. 11 and 12, a laminated all-solid-state secondary battery 310 includes a laminated body 320 in which a positive electrode 330 and a negative electrode 340 are laminated with a solid electrolyte layer 350 interposed therebetween. The positive electrode 330 includes a positive electrode current collector layer 331 and a positive electrode active material layer 332. The negative electrode 340 includes a negative electrode current collector layer 341 and a negative electrode active material layer 342. The laminated body 320 is a hexahedron and includes four side surfaces (a first side surface 321, a second side surface 322, a third side surface 323, and a fourth side surface 324) which are formed as surfaces parallel to the laminating direction, an upper surface 325 which is formed on the upper side as a surface orthogonal to the laminating direction, and a lower surface 326 which is formed on the lower side. The positive electrode current collector layer is exposed to the first side surface 321 and the negative electrode current collector layer is exposed to the second side surface 322. The third side surface 323 is a side surface on the right side when viewed from the first side surface 321 with the upper surface 325 facing upward and the fourth side surface 324 is a side surface on the left side when viewed from the first side surface 321 with the upper surface 325 facing upward.

An outer positive electrode 360 electrically connected to the positive electrode current collector layer 331 is attached to the first side surface 321 of the laminated body 320. The outer positive electrode 360 includes a side surface sub-electrode 360a which extends to the third side surface 323 and the fourth side surface 324, an upper surface sub-electrode 360b which extends to the upper surface 325, and a lower surface sub-electrode 360c which extends to the lower surface 326. That is, the outer positive electrode 360 has a U-shaped cross-section and has five surfaces. The end portion of the side surface sub-electrode 360a (the side end portion of the outer positive electrode 360) is provided at a position facing the negative electrode 340 (the side surface of the negative electrode 340). Here, the facing position means a position in which the side surface sub-electrode 360a overlaps the negative electrode 340 when the laminated all-solid-state secondary battery 310 is viewed through. The end portion of the upper surface sub-electrode 360b (the upper end portion of the outer positive electrode 360) is located at a position facing the negative electrode 340 (the upper surface of the negative electrode 340). The end portion of the lower surface sub-electrode 360c (the lower end portion of the outer positive electrode 360) is located at a position facing the negative electrode 340 (the lower surface of the negative electrode 340).

An outer negative electrode 370 electrically connected to the negative electrode current collector layer 341 is attached to the second side surface 322 of the laminated body 320. The outer negative electrode 370 includes a side surface sub-electrode 370a which extends to the third side surface 323 and the fourth side surface 324, an upper surface sub-electrode 370b which extends to the upper surface 325, and a lower surface sub-electrode 370c which extends to the lower surface 326. That is, the outer negative electrode 370 has a U-shaped cross-section and has five surfaces. The end portion of the side surface sub-electrode 370a (the side end portion of the outer negative electrode 370) is located at a position facing the positive electrode 330 (the side surface of the positive electrode 330). The end portion of the upper surface sub-electrode 370b (the upper end portion of the outer negative electrode 370) is located at a position facing the positive electrode 330 (the upper surface of the positive electrode 330). The end portion of the lower surface sub-electrode 370c (the lower end portion of the outer negative electrode 370) is located at a position facing the positive electrode 330 (the lower surface of the positive electrode 330).

In the laminated all-solid-state secondary battery 310, the end portions of the side surface sub-electrode 360a, the upper surface sub-electrode 360b, and the lower surface sub-electrode 360c of the outer positive electrode 360 extend to a position facing the negative electrode 340 and the end portions of the side surface sub-electrode 370a, the upper surface sub-electrode 370b, and the lower surface sub-electrode 370c of the outer negative electrode 370 extend to a position facing the positive electrode 330. For this reason, the parasitic capacitance of the negative electrode 340 is generated at four positions among the outer positive electrode 360, the side surface sub-electrode 360a, the lower surface sub-electrode 360c, and the negative electrode 340 as indicated by an arrow P. Further, the parasitic capacitance of the positive electrode 330 is generated at four positions among the outer negative electrode 370, the side surface sub-electrode 370a, the upper surface sub-electrode 370b, and the positive electrode 330 as indicated by an arrow Q. In order to increase the charge and discharge capacity of the laminated all-solid-state secondary battery 310, it is preferable that the facing area between the positive electrode 330 and the negative electrode 340 be wide, that is, the gap between the positive electrode 330 and the second side surface 322 be narrow and the gap between the negative electrode 340 and the first side surface 321 be narrow. However, when the gap between the positive electrode 330 and the second side surface 322 is narrow and the gap between the negative electrode 340 and the first side surface 321 is narrow, the parasitic capacitance is likely to be generated. When the parasitic capacitance is generated, the current consumption other than the charge and discharge reaction is reduced, so that the continuous discharge characteristics (pulse discharge cycle characteristics) of a large instantaneous current are reduced. Thus, the conventional laminated all-solid-state secondary battery 310 cannot easily improve both the charge and discharge capacity and the pulse discharge cycle characteristics.

First Embodiment

Next, a laminated all-solid-state secondary battery according to a first embodiment of the present invention will be described.

Figure 2:
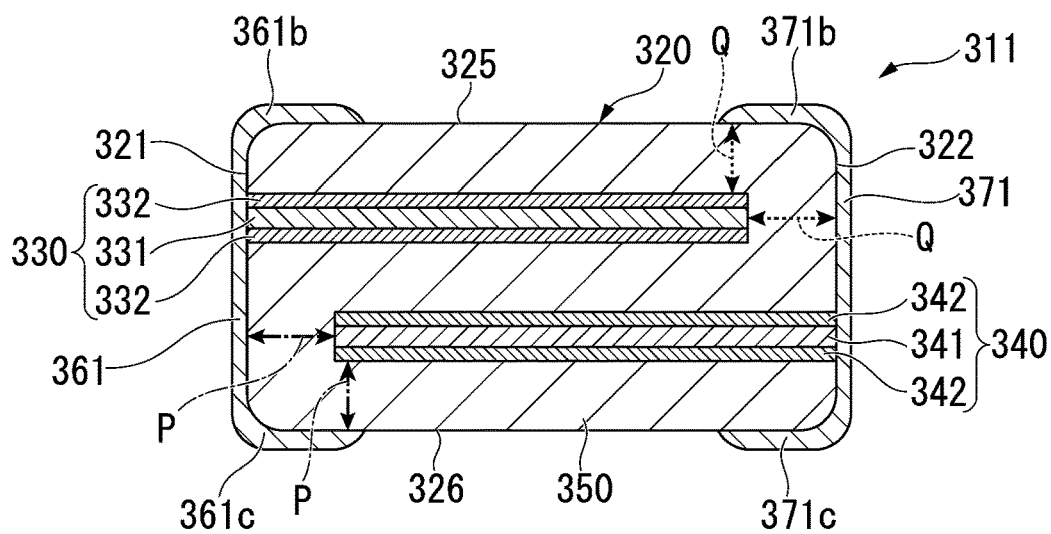
FIG. 2 is a cross-sectional view taken along a line II-II of FIG. 1.

FIG. 1 is a schematic view of the laminated all-solid-state secondary battery according to the first embodiment, where FIG. 1(a) is a plan view when viewed from above and FIG. 1(b) is a bottom view when viewed from below. FIG. 2 is a cross-sectional view taken along a line II-II of FIG. 1. Further, in the description of the first embodiment, the same reference numerals will be given to the configurations overlapping with the conventional laminated all-solid-state secondary battery 310 and the description thereof will be omitted.

As shown in FIGS. 1 and 2, in a laminated all-solid-state secondary battery 311 of this embodiment, an outer positive electrode 361 is attached to the first side surface 321 of the laminated body 320. An outer negative electrode 371 is attached to the second side surface 322 of the laminated body 320.

The outer positive electrode 361 is an electrode having a U-shaped cross-section and including an upper surface sub-electrode 361b extending to the upper surface 325 and a lower surface sub-electrode 361c extending to the lower surface 326. The end portion of the upper surface sub-electrode 361b (the upper end portion of the outer positive electrode 361) is located at a position facing the negative electrode 340 (the upper surface of the negative electrode 340). The end portion of the lower surface sub-electrode 361c (the lower end portion of the outer positive electrode 361) is located at a position facing the negative electrode 340 (the lower surface of the negative electrode 340). The outer positive electrode 361 does not include a side surface sub-electrode which extends to the third side surface 323 and the fourth side surface 324. However, when the end portion of the side surface sub-electrode (the side end portion of the outer negative electrode 371) is located at a position not facing the negative electrode 340 (the side surface of the negative electrode 340), the outer positive electrode 361 may include the side surface sub-electrode. Here, the non-facing position means a position in which the side surface sub-electrode does not overlap the negative electrode 340 when the laminated all-solid-state secondary battery 311 is viewed through. When the outer positive electrode 361 includes the side surface sub-electrode, the end portion of the side surface sub-electrode is preferably in a range of 10 μm or less from the end portions of the third side surface 323 and the fourth side surface 324 on the side of the first side surface 321.

The outer negative electrode 371 is an electrode having a U-shaped cross-section and including an upper surface sub-electrode 371b extending to the upper surface 325 and a lower surface sub-electrode 371c extending to the lower surface 326. The end portion of the upper surface sub-electrode 371b (the upper end portion of the outer negative electrode 371) is located at a position facing the positive electrode 330 (the upper surface of the positive electrode 330). The end portion of the lower surface sub-electrode 371c (the lower end portion of the outer negative electrode 371) is located at a position facing the positive electrode 330 (the lower surface of the positive electrode 330). The outer negative electrode 371 does not include a side surface sub-electrode which extends to the third side surface 323 and the fourth side surface 324. However, when the end portion of the side surface sub-electrode (the side end portion of the outer positive electrode 361) is located at a position not facing the positive electrode 330 (the side surface of the positive electrode 330), the outer negative electrode 371 may include the side surface sub-electrode. Here, the non-facing position means a position in which the side surface sub-electrode does not overlap the positive electrode 330 when the laminated all-solid-state secondary battery 311 is viewed through. When the outer negative electrode 371 includes the side surface sub-electrode, the end portion of the side surface sub-electrode is preferably in a range of 10 μm or less from the end portions of the third side surface 323 and the fourth side surface 324 on the side of the second side surface 322.

In the laminated all-solid-state secondary battery 311 of this embodiment, the parasitic capacitance generating position of the negative electrode 340 is suppressed at two positions among the outer positive electrode 361, a lower surface sub-electrode 361c, and the negative electrode 340 as indicated by an arrow P. Further, the parasitic capacitance generating position of the positive electrode 330 is suppressed at two positions among the outer negative electrode 371, the upper surface sub-electrode 371b, and the positive electrode 330 as indicated by an arrow Q. In this way, in the laminated all-solid-state secondary battery 311 of this embodiment, the generation of the parasitic capacitance is suppressed compared to the conventional laminated all-solid-state secondary battery 310 and hence the pulse discharge cycle characteristics are improved. Further, since the generation of the parasitic capacitance is suppressed, the current distribution associated with the charge and discharge reaction becomes uniform and the cell reaction proceeds uniformly. As a result, the charge and discharge capacity is improved.

In the laminated all-solid-state secondary battery 311, the materials of the positive electrode current collector layer 331, the positive electrode active material layer 332, the negative electrode current collector layer 341, the negative electrode active material layer 342, the solid electrolyte layer 350, the outer positive electrode 361, and the outer negative electrode 371 are not particularly limited and known materials used in the conventional laminated all-solid-state secondary battery can be used.

As the materials of the positive electrode current collector layer 331 and the negative electrode current collector layer 341, it is preferable to use a material having a large conductivity. Specifically, metals such as silver, palladium, gold, platinum, aluminum, copper, and nickel can be used. Further, a mixture of the metal and the positive electrode active material may be used as the material of the positive electrode current collector layer 331 and a mixture of the metal and the negative electrode active material may be used as the material of the negative electrode current collector layer 341.

The positive electrode active material layer 332 and the negative electrode active material layer 342 include a positive electrode active material and a negative electrode active material that transfer electrons. In addition, a conductive assistant, a binder, or the like may be included. It is preferable that the positive electrode active material and the negative electrode active material can efficiently intercalate and deintercalate lithium ions.

As the positive electrode active material and the negative electrode active material, for example, a transition metal oxide or a transition metal composite oxide is preferably used. Specifically, lithium manganese composite oxide $Li_2Mn_aMa_{1-a}O_3$ (0.8≤a≤1, Ma=Co, Ni), lithium cobalt oxide ($LiCoO_2$), lithium nickelate ($LiNiO_2$), lithium manganese spinel ($LiMn_2O_4$), composite metal oxide represented by a general formula: $LiNi_xCo_yMn_zO_2$ (x+y+z=1, 0≤x≤1, 0≤y≤1, 0≤z≤1), lithium vanadium compound ($LiV_2O_5$), olivin type $LiMbPO_4$ (here, Mb is one or more elements selected from Co, Ni, Mn, Fe, Mg, Nb, Ti, Al, and Zr), lithium vanadium phosphate ($Li_3V_2(PO_4)_3$ or LiVOPO$_4$), Li excess solid solution represented by Li$_2$MnO$_3$-LiMcO$_2$ (Mc=Mn, Co, Ni), lithium titanate (Li$_4$Ti$_5$O$_{12}$), composite metal oxide represented by Li$_s$Ni$_t$Co$_u$Al$_v$O$_2$ (0.9<s<1.3, 0.9<t+u+v<1.1), and the like can be used.

The positive electrode active material and the negative electrode active material may be selected according to the solid electrolyte described later. For example, when Li$_{1+n}$Al$_n$T$_{2-n}$(PO$_4$)$_3$ (0≤n≤0.6) is used as the solid electrolyte, it is preferable to use one or both of LiVOPO$_4$ and Li$_3$V$_2$(PO$_4$)$_3$ for the positive electrode active material and the negative electrode active material. In this case, the bonding at the interfaces among the positive electrode active material layer 332, the negative electrode active material layer 342, and the solid electrolyte layer 350 becomes strong. Further, the contact area of the interfaces among the positive electrode active material layer 332, the negative electrode active material layer 342, and the solid electrolyte layer 350 can be widened.

The solid electrolyte layer 350 includes solid electrolyte. As the solid electrolyte, it is preferable to use a material having low electron conductivity and high lithium ion conductivity. Specifically, for example, at least one selected from a group consisting of perovskite type compound such as La$_{0.51}$Li$_{0.34}$TiO$_{2.94}$ and La$_{0.5}$Li$_{0.5}$TiO$_3$, lysicon type compound such as Li$_{14}$Zn(GeO$_4$)$_4$, garnet type compound such as Li$_7$La$_3$Zr$_2$O$_{12}$, nasicon type compound such as LiZr$_2$(PO$_4$)$_3$, Li$_{1.3}$Al$_{0.3}$Ti$_{1.7}$(PO$_4$)$_3$, and Li$_{1.5}$Al$_{0.5}$Ge$_{1.5}$(PO$_4$)$_3$, thioricicon type compound such as Li$_{3.2}$Ge$_{0.25}$P$_{0.75}$S$_4$ and Li$_3$PS$_4$, glass compound such as 50Li$_4$SiO$_4$.50Li$_3$BO$_3$, Li$_2$S—P$_2$S$_5$, and Li$_2$O—Li$_3$O$_5$—SiO$_2$, phosphoric acid compound such as Li$_3$PO$_4$, Li$_{3.5}$Si$_{0.5}$P$_{0.5}$O$_4$, and Li$_{2.9}$PO$_{3.3}$N$_{0.46}$, amorphous such as Li$_{2.9}$PO$_{3.3}$N$_{0.46}$ (LIPON) and Li$_{3.6}$Si$_{0.6}$P$_{0.4}$O$_4$, and glass ceramics such as Li$_{1.07}$Al$_{0.69}$Ti$_{1.46}$(PO$_4$)$_3$ and Li$_{1.5}$Al$_{0.5}$Ge$_{1.5}$(PO$_4$)$_3$ is preferable.

As the materials of the outer positive electrode 361 and the outer negative electrode 371, it is preferable to use a material having a large conductivity. For example, silver, gold, platinum, aluminum, copper, tin, and nickel can be used.

(Method for Manufacturing Laminated all-Solid-State Secondary Battery)

Next, a method for manufacturing the laminated all-solid-state secondary battery 311 of this embodiment will be described.

The laminated all-solid-state secondary battery 311 can be manufactured according to, for example, a method including a paste preparing step of preparing paste of each member constituting the laminated body 320, a unit manufacturing step of manufacturing a positive electrode unit and a negative electrode unit using the manufactured paste, a laminating step of manufacturing a laminated structure by alternately laminating the positive electrode unit and the negative electrode unit obtained as described above, a cutting step of cutting the obtained laminated structure into a predetermined shape, a baking step of obtaining the laminated body 320 by baking the laminated structure, and an outer electrode forming step of forming an outer electrode (the outer positive electrode 361 and the outer negative electrode 371) on the side surface of the obtained laminated body 320.

<Paste Preparing Step>

In the paste preparing step, each member of the positive electrode current collector layer, the positive electrode active material layer, the solid electrolyte layer, the negative electrode current collector layer, the negative electrode active material layer, the outer electrode is made into paste. The method for making paste is not particularly limited, but for example, paste can be prepared by mixing the powder of each member and the vehicle. As a mixing device for preparing the paste, a conventionally known kneading device such as a bead mill, a planetary paste kneader, an automatic grinder, a three-roll mill, a high-share mixer, and a planetary mixer can be used. Here, the vehicle is a general term for a medium in a liquid phase and includes a solvent, a binder, and the like. The binder included in the paste of each member is not particularly limited, but polyvinyl acetal resin, polyvinyl butyral resin, terpineol resin, ethyl cellulose resin, acrylic resin, urethane resin, vinyl acetate resin, polyvinyl alcohol resin, and the like can be used. One of these resins may be used alone, or two or more of these resins may be used in combination.

Further, the paste of each material may include a plasticizer. The type of plasticizer is not particularly limited, but ester phthalates such as dioctyl phthalate and diisononyl phthalate may be used.

By a related method, paste for the positive electrode current collector layer, paste for the positive electrode active material layer, paste for the solid electrolyte layer, paste for the negative electrode active material layer, and paste for the negative electrode current collector layer are prepared.

<Unit Manufacturing Step>

The positive electrode unit is a laminated body having a positive electrode in which a positive electrode active material layer, a positive electrode current collector layer, and a positive electrode active material layer are sequentially laminated on a green sheet for a solid electrolyte layer. This positive electrode unit can be manufactured as below.

First, the prepared paste for the solid electrolyte layer is applied on a base such as a polyethylene terephthalate (PET) film to a desired thickness and is dried to manufacture a green sheet for the solid electrolyte layer. A method for applying the paste for the solid electrolyte layer is not particularly limited and known methods such as a doctor blade method, a die coater method, a comma coater method, and a gravure coater method can be adopted. Next, the paste for the positive electrode active material layer, the paste for the positive electrode current collector layer, and the paste for the positive electrode active material layer are laminated in this order on the green sheet for the solid electrolyte layer and are dried to form a positive electrode having the positive electrode active material layer, the positive electrode current collector layer, and the positive electrode active material layer laminated in this order. Further, in order to fill a step between the green sheet for the solid electrolyte layer and the positive electrode, the paste for the solid electrolyte layer is printed on a region (margin) other than the positive electrode by a screen printing method and is dried to form a solid electrolyte layer having a height equivalent to that of the positive electrode. Then, the base is peeled off to obtain a positive electrode unit in which the positive electrode is formed on the green sheet for the solid electrolyte layer.

The negative electrode unit is a laminated body having a negative electrode in which a negative electrode active material layer, a negative electrode current collector layer, and a negative electrode active material layer are laminated in this order on the green sheet for the solid electrolyte layer. This negative electrode unit can be manufactured similarly to the method for manufacturing the positive electrode unit except that the paste for the negative electrode active material layer and the paste for the negative electrode current collector layer are used instead of the paste for the positive electrode current collector layer and the paste for the positive electrode active material layer.

<Laminating Step>

In the laminating step, the positive electrode unit and the negative electrode unit are alternately laminated. Accordingly, a laminated structure including the plurality of positive electrode units and the plurality of negative electrode units is manufactured.

Further, the manufactured laminated structures are collectively pressed and crimped with a die press, a hot water isobaric press (WIP), a cold water isobaric press (CIP), a hydrostatic press, and the like so that the adhesion between the positive electrode unit and the negative electrode unit can be improved. Pressurization is preferably performed in a heated state and can be performed, for example, at 40 to 95° C.

<Cutting Step>

In the cutting step, the manufactured laminated structure is cut in the laminating direction of the laminated structure so that the positive electrode current collector layer of the positive electrode unit and the negative electrode current collector layer of the negative electrode unit are exposed to the side surface of the laminated structure.

As a device for cutting the laminated structure, a dicing blade, a fine laser processing machine, or the like can be used.

<Baking Step>

In the baking step, the laminated structure is baked and sintered to obtain the laminated body 320 of the laminated all-solid-state secondary battery 311. By baking, the solid electrolyte layer, the electrode layer, and the current collector layer are densified to obtain the desired electrical properties. Baking can be performed in a non-oxidizing atmosphere when the material constituting the current collector layer is not suitable for heat treatment in an oxidizing atmosphere. The baking temperature is, for example, a temperature equal to or higher than 600° C. and equal to or lower than 1000° C. The baking time is, for example, in the range equal to or longer than 0.1 hour and equal to or shorter than 3 hours. The non-oxidizing atmosphere is a nitrogen atmosphere, an argon atmosphere, a nitrogen-hydrogen mixed atmosphere, or the like.

Before the baking step, a debinder treatment can be performed as a step separate from the baking step. By heat-decomposing the binder component included in the laminated structure before baking, it is possible to suppress the rapid decomposition of the binder component in the baking step. The debinder treatment is performed by heating, for example, in a non-oxidizing atmosphere at a temperature equal to or higher than the decomposition temperature of the binder component and lower than the sintering temperature of the laminated structure (usually in the range equal to or higher than 300° C. and equal to or lower than 800° C.) in the range equal to or longer than 0.1 hour and equal to or shorter than 10 hours.

<Outer Electrode Forming Step>

In the outer electrode forming step, an outer electrode is formed on the side surface of the obtained laminated body 320 using conductive material paste for the outer electrode. Specifically, the outer positive electrode 361 is formed on the first side surface 321 of the laminated body 320 and the outer negative electrode 371 is formed on the second side surface 322 to respectively have a predetermined shape and are burned. As a method for molding the outer positive electrode 361 and the outer negative electrode 371, known methods such as a screen printing method, a sputtering method, a dip coating method, and a spray coating method can be used. As a method for forming the outer positive electrode 361 and the outer negative electrode 371 into a predetermined shape by using a screen printing method, a sputtering method, a dip coating method, or a spray coating method, for example, a method for masking a region other than the region where an outer electrode is desired to be formed on the side surface of the laminated body 320 can be used with a masking jig, tape, or the like. The conditions of the burning treatment differ depending on the metal material type of the outer electrode, but the burning treatment can be performed by heating at a temperature equal to or higher than 200° C. and equal to or lower than 600° C. in a reducing atmosphere. Further, the outer electrode may be formed by forming a nickel (Ni) layer, a tin (Sn) layer, or the like on the surface of the outer electrode by a plating method, a sputtering method, or the like in order to improve the wettability with the solder.

Before the outer electrode forming step, the laminated body 320 may be placed in a cylindrical container together with an abrasive such as alumina and barrel-polished. Accordingly, the corners of the laminated body 320 can be chamfered. As another method, it may be polished by sandblasting.

Second Embodiment

Next, a laminated all-solid-state secondary battery according to a second embodiment of the present invention will be described.

Figure 3:
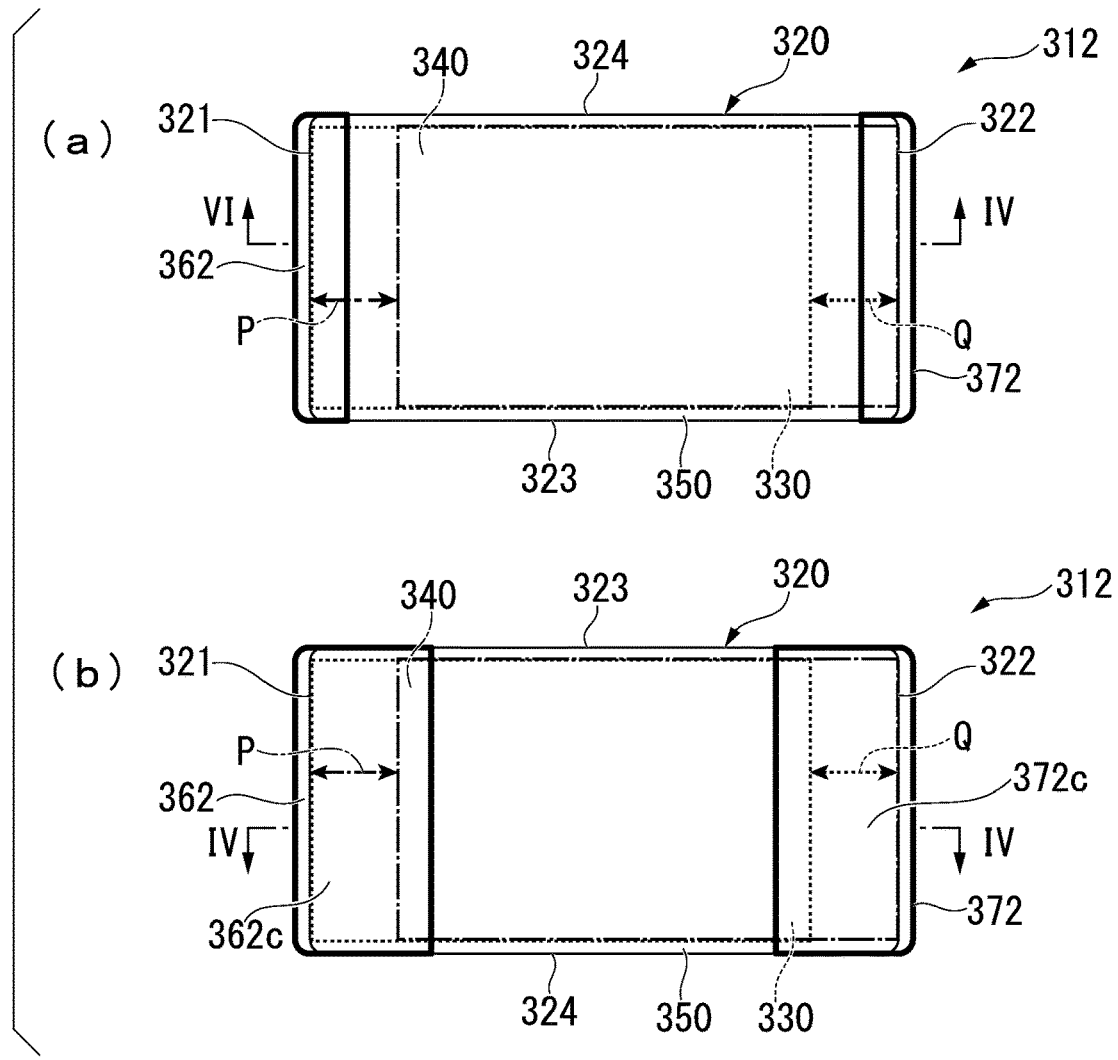
FIG. 3 is a schematic view of a laminated all-solid-state secondary battery according to a second embodiment, where
Figure 4:
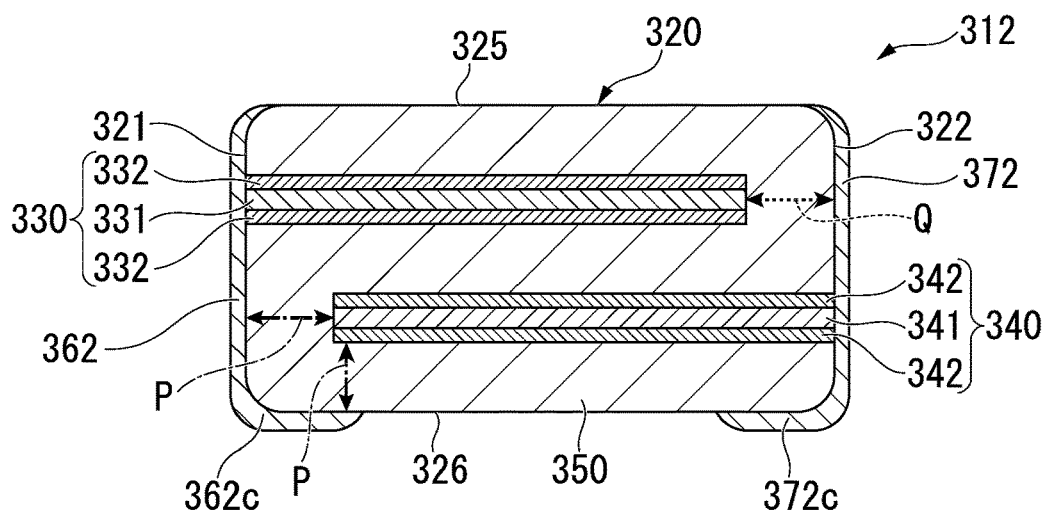
FIG. 4 is a cross-sectional view taken along a line IV-IV of FIG. 3.

FIG. 3 is a schematic view of the laminated all-solid-state secondary battery according to the second embodiment, where FIG. 3($a$) is a plan view when viewed from above and FIG. 3($b$) is a bottom view when viewed from below. FIG. 4 is a cross-sectional view taken along a line IV-IV of FIG. 3. Further, in the description of the second embodiment, the same reference numerals will be given to the configurations overlapping with the laminated all-solid-state secondary battery 311 of the first embodiment and the description thereof will be omitted.

As shown in FIGS. 3 and 4, in a laminated all-solid-state secondary battery 312 of this embodiment, an outer positive electrode 362 is attached to the first side surface 321 of the laminated body 320. An outer negative electrode 372 is attached to the second side surface 322 of the laminated body 320.

The outer positive electrode 362 is an electrode having an L-shaped cross-section and including the lower surface sub-electrode 362$c$ extending to the lower surface 326. The end portion of the lower surface sub-electrode 362$c$ (the lower end portion of the outer positive electrode 362) is located at a position not facing the negative electrode 340 (the lower surface of the negative electrode 340). The outer positive electrode 362 does not include the side surface sub-electrode extending to the third side surface 323 and the fourth side surface 324 and does not include the upper surface sub-electrode 361$b$ in the laminated all-solid-state secondary battery 311 of the first embodiment.

The outer negative electrode 372 is an electrode having an L-shaped cross-section and including the lower surface sub-electrode 372$c$ extending to the lower surface 326. The end portion of the lower surface sub-electrode 372$c$ (the lower end portion of the outer negative electrode 372) is located at a position facing the positive electrode 330 (the lower surface of the positive electrode 330). The outer negative electrode 372 does not include the side surface sub-electrode extending to the third side surface 323 and the fourth side surface 324 and does not include the upper surface sub-electrode 371$b$ in the laminated all-solid-state secondary battery 311 of the first embodiment.

In the laminated all-solid-state secondary battery 312 of this embodiment, the parasitic capacitance generating position of the negative electrode 340 is suppressed at two positions among the outer positive electrode 362, the lower surface sub-electrode 362c, and the negative electrode 340 as indicated by an arrow P. Further, the parasitic capacitance of the positive electrode 330 is suppressed at one position between the outer negative electrode 372 and the positive electrode 330 as indicated by an arrow Q. In this way, in the laminated all-solid-state secondary battery 312 of this embodiment, since the generation of the parasitic capacitance is suppressed compared to the laminated all-solid-state secondary battery 311 of the first embodiment, the pulse discharge cycle characteristics and the charge and discharge capacity are further improved.

Third Embodiment

Next, a laminated all-solid-state secondary battery according to a third embodiment of the present invention will be described.

Figure 5:
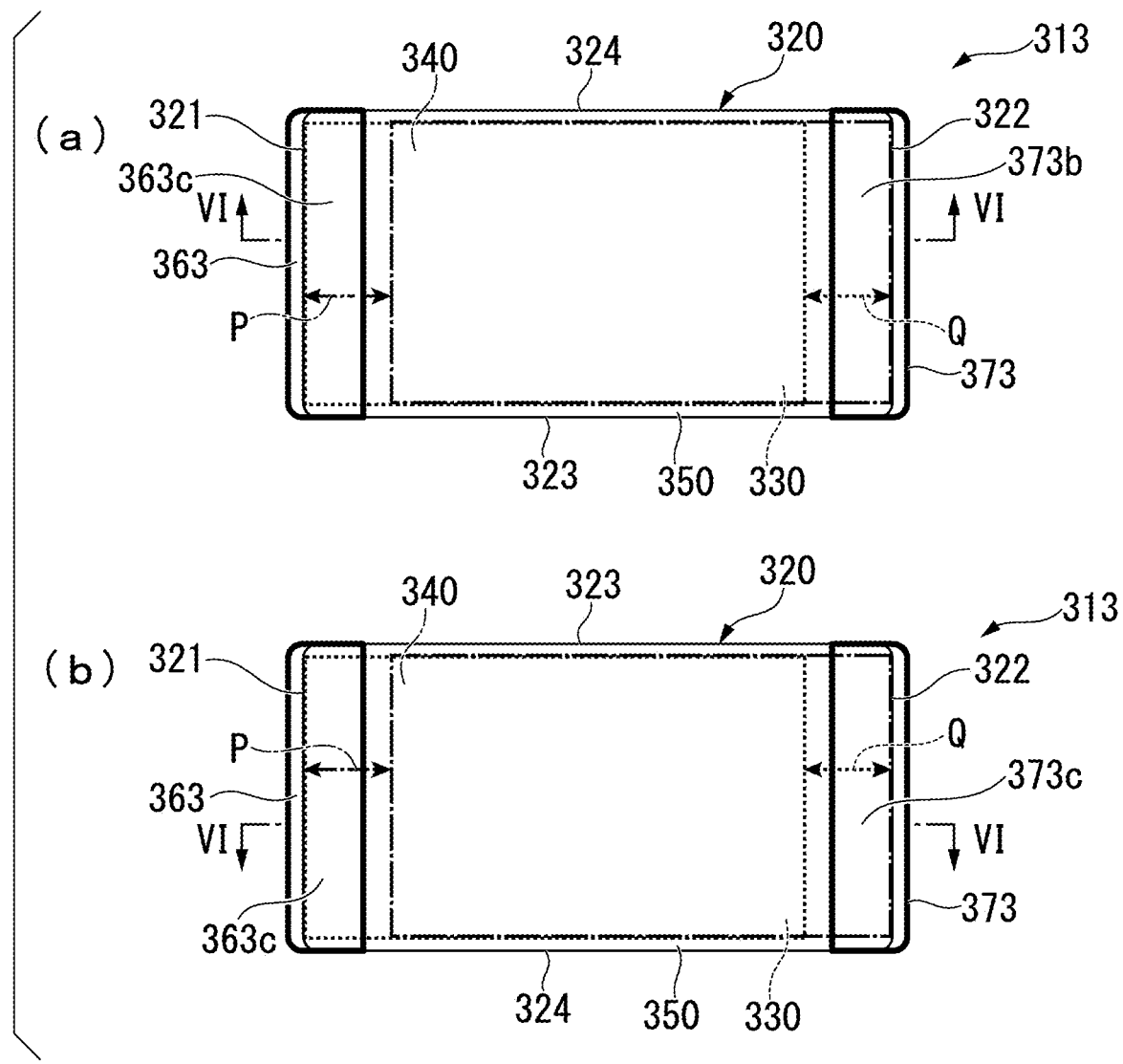
FIG. 5 is a schematic view of a laminated all-solid-state secondary battery according to a third embodiment, where FIG. 5(a) a plan view when viewed from above

FIG. 5 is a schematic view of the laminated all-solid-state secondary battery according to the third embodiment, where FIG. 5(a) is a plan view when viewed from above and FIG. 5(b) is a bottom view when viewed from below. FIG. 6 is a cross-sectional view taken along a line VI-VI of FIG. 5. Further, in the description of the third embodiment, the same reference numerals will be given to the configurations overlapping with the laminated all-solid-state secondary battery 311 of the first embodiment and the description thereof will be omitted.

As shown in FIGS. 5 and 6, in a laminated all-solid-state secondary battery 313 of this embodiment, an outer positive electrode 363 is attached to the first side surface 321 of the laminated body 320. An outer negative electrode 373 is attached to the second side surface 322 of the laminated body 320.

The outer positive electrode 363 is an electrode having a U-shaped cross-section, including an upper surface sub-electrode 363b extending to the upper surface 325 and a lower surface sub-electrode 363c extending to the lower surface 326, and not including the side surface sub-electrode extending to the third side surface 323 and the fourth side surface 324. The end portion of the upper surface sub-electrode 363b (the upper end portion of the outer positive electrode 363) is located at a position not facing the negative electrode 340 (the upper surface of the negative electrode 340). The end portion of the lower surface sub-electrode 363c (the lower end portion of the outer positive electrode 363) is located at a position not facing the negative electrode 340 (the lower surface of the negative electrode 340).

The outer negative electrode 373 is an electrode having a U-shaped cross-section, including an upper surface sub-electrode 373b extending to the upper surface 325 and a lower surface sub-electrode 373c extending to the lower surface 326, and not including the side surface sub-electrode extending to the third side surface 323 and the fourth side surface 324. The end portion of the upper surface sub-electrode 373b (the upper end portion of the outer negative electrode 373) is located at a position not facing the positive electrode 330 (the upper surface of the positive electrode 330). The end portion of the lower surface sub-electrode 373c (the lower end portion of the outer negative electrode 371) is located at a position not facing the positive electrode 330 (the lower surface of the positive electrode 330).

In the laminated all-solid-state secondary battery 313 of this embodiment, the parasitic capacitance of the negative electrode 340 is suppressed at one position between the outer positive electrode 363 and the negative electrode 340 as indicated by an arrow P. Further, the parasitic capacitance of the positive electrode 330 is suppressed at one position between the outer negative electrode 373 and the positive electrode 330 as indicated by an arrow Q. In this way, in the laminated all-solid-state secondary battery 313 of this embodiment, since the generation of the parasitic capacitance is further suppressed compared to the laminated all-solid-state secondary battery 311 of the first embodiment, the pulse discharge cycle characteristics and the charge and discharge capacity are further improved.

Fourth Embodiment

Next, a laminated all-solid-state secondary battery according to a fourth embodiment of the present invention will be described.

Figure 7:
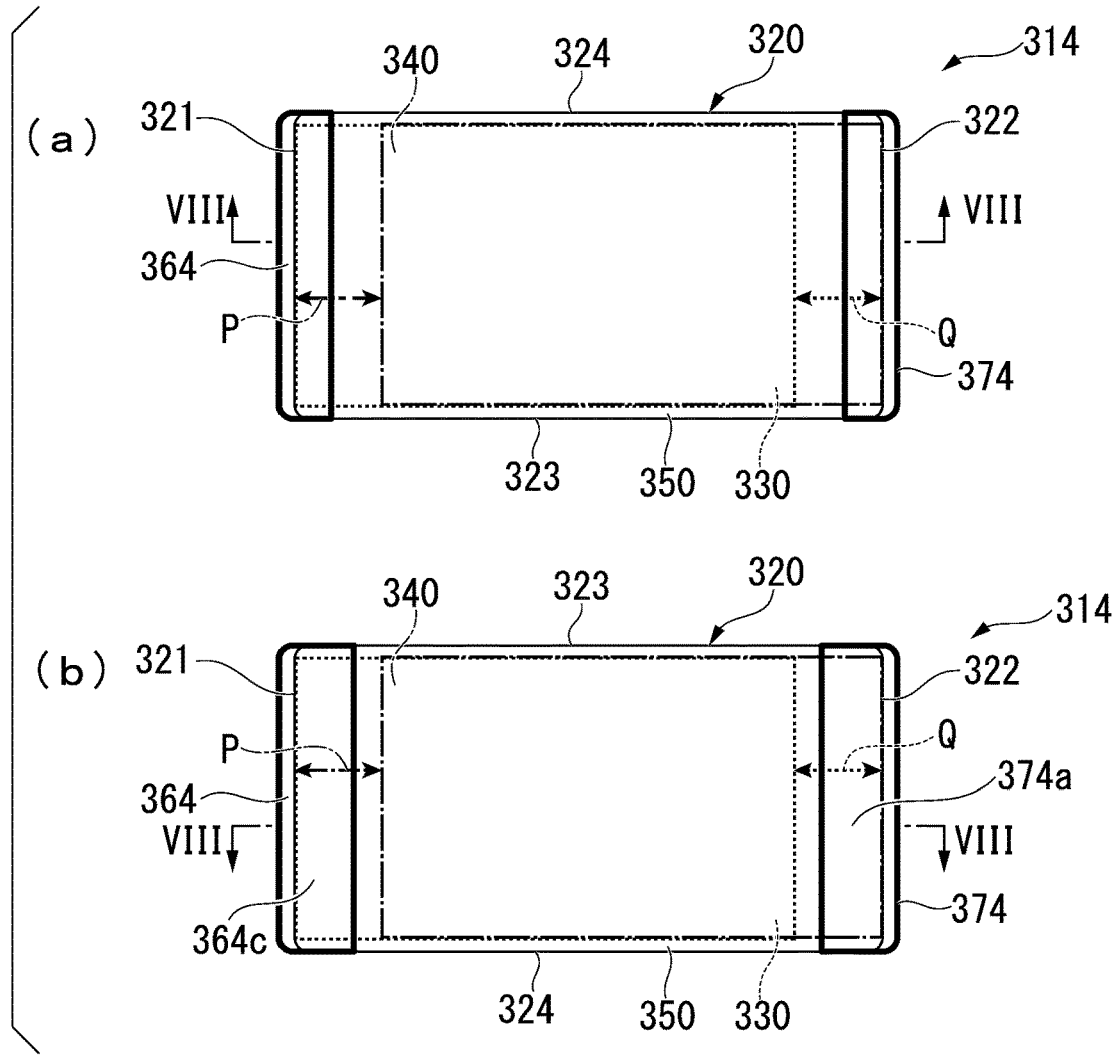
FIG. 7 is a schematic view of a laminated all-solid-state secondary battery according to a fourth embodiment, where
Figure 8:
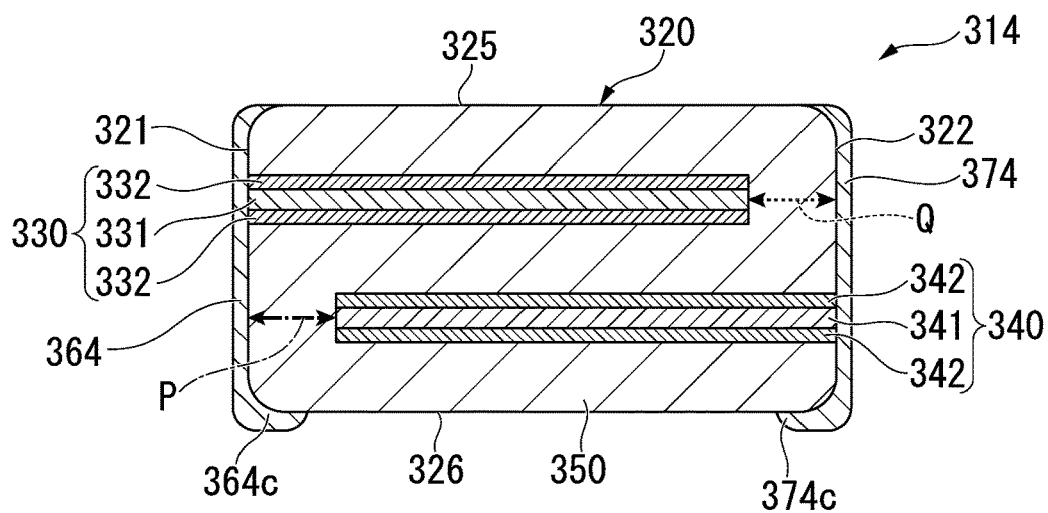
FIG. 8 is a cross-sectional view taken along a line VIII-VIII of FIG. 7.

FIG. 7 is a schematic view of the laminated all-solid-state secondary battery according to the fourth embodiment, where FIG. 7(a) is a plan view when viewed from above and FIG. 7(b) is a bottom view when viewed from below. FIG. 8 is a cross-sectional view taken along a line VIII-VIII of FIG. 7. Further, in the description of the fourth embodiment, the same reference numerals will be given to the configurations overlapping with the laminated all-solid-state secondary battery 311 of the first embodiment and the description thereof will be omitted.

As shown in FIGS. 7 and 8, in the laminated all-solid-state secondary battery 314 of this embodiment, an outer positive electrode 364 is attached to the first side surface 321 of the laminated body 320. An outer negative electrode 374 is attached to the second side surface 322 of the laminated body 320.

The outer positive electrode 364 is an electrode having an L-shaped cross-section and including a lower surface sub-electrode 364c extending to the lower surface 326. The end portion of the lower surface sub-electrode 364c (the lower end portion of the outer positive electrode 364) is located at a position not facing the negative electrode 340 (the lower surface of the negative electrode 340). The outer positive electrode 364 does not include the side surface sub-electrode extending to the third side surface 323 and the fourth side surface 324 and does not include the upper surface sub-electrode 361b in the laminated all-solid-state secondary battery 311 of the first embodiment.

The outer negative electrode 374 is an electrode having an L-shaped cross-section and including a lower surface sub-electrode 374c extending to the lower surface 326. The end portion of the lower surface sub-electrode 374c (the lower end portion of the outer negative electrode 374) is located at a position not facing the positive electrode 330 (the lower surface of the positive electrode 330). The outer negative electrode 374 does not include the side surface sub-electrode extending to the third side surface 323 and the fourth side surface 324 and does not include the upper surface sub-electrode 371b in the laminated all-solid-state secondary battery 311 of the first embodiment.

In the laminated all-solid-state secondary battery 314 of this embodiment, the parasitic capacitance of the negative electrode 340 is suppressed at one position between the outer positive electrode 364 and the negative electrode 340 as indicated by an arrow P. Further, the parasitic capacitance of the positive electrode 330 is suppressed at one position between the outer negative electrode 372 and the positive electrode 330 as indicated by an arrow Q. In this way, in the laminated all-solid-state secondary battery 314 of this embodiment, since the generation of the parasitic capacitance is suppressed similarly to the laminated all-solid-state secondary battery 313 of the third embodiment, the pulse discharge cycle characteristics and the charge and discharge capacity are further improved.

Fifth Embodiment

Next, a laminated all-solid-state secondary battery according to a fifth embodiment of the present invention will be described.

Figure 9:
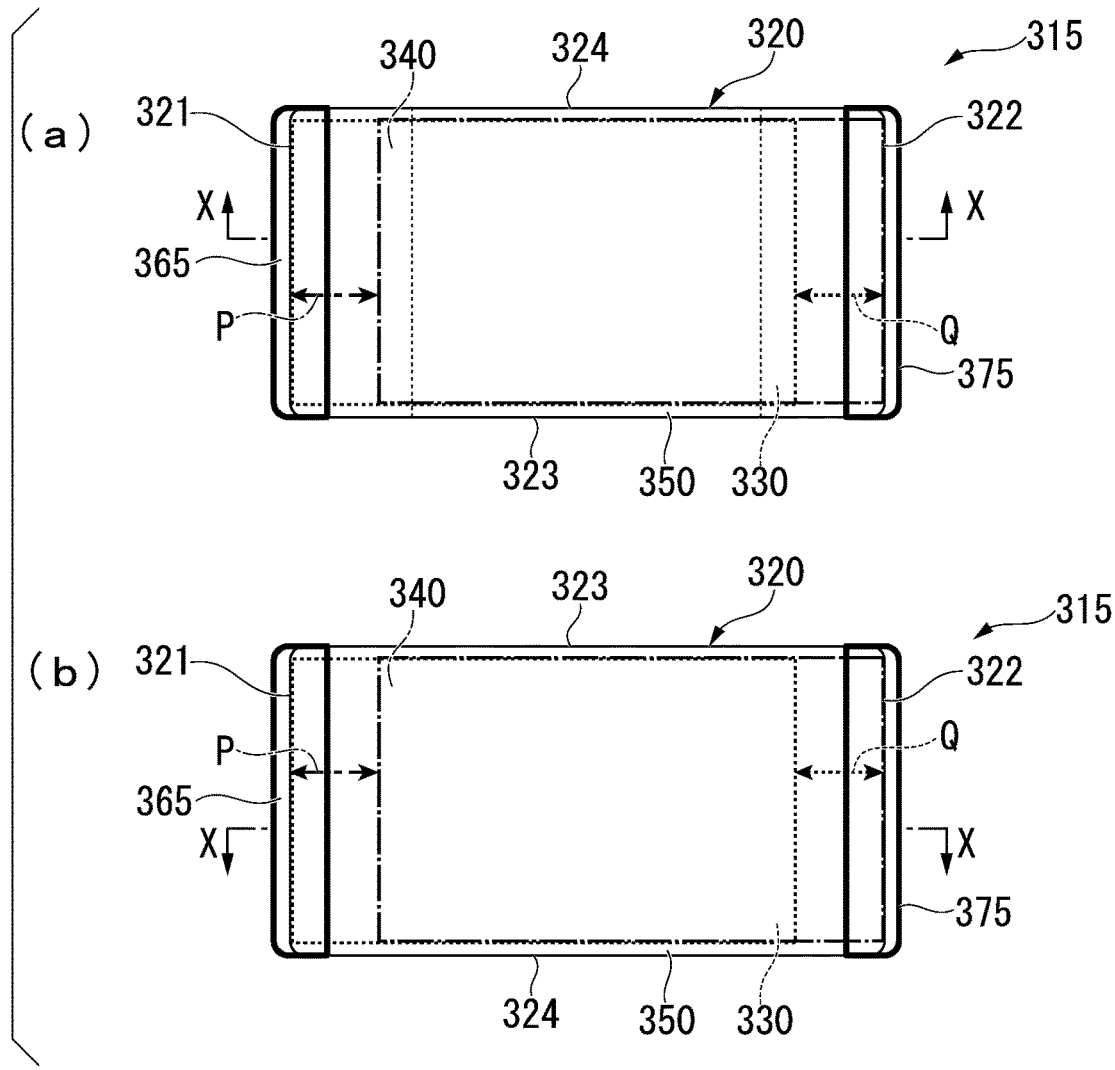
FIG. 9 is a schematic view of a laminated all-solid-state secondary battery according to a fifth embodiment, where
Figure 10:
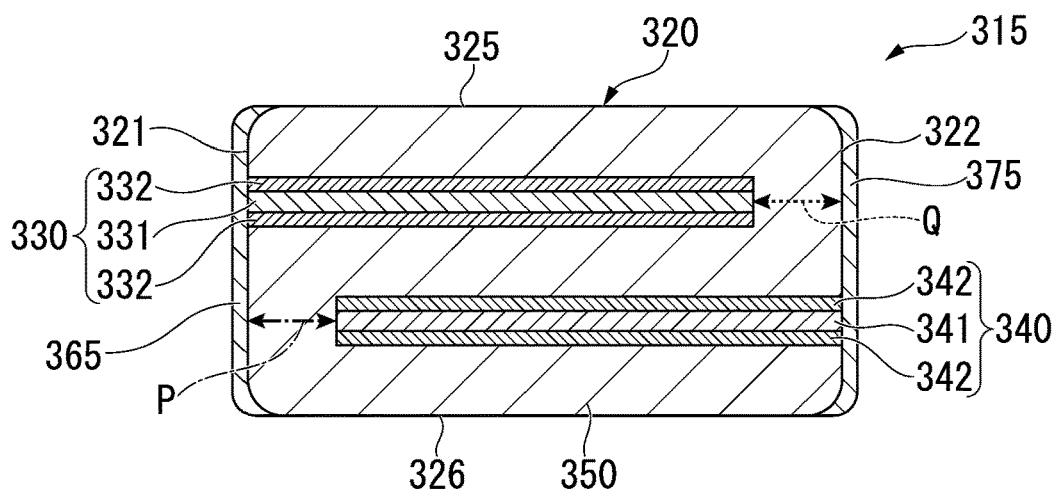
FIG. 10 is a cross-sectional view taken along a line X-X of FIG. 9.

FIG. 9 is a schematic view of the laminated all-solid-state secondary battery according to the fifth embodiment, where FIG. 9(a) is a plan view when viewed from above and FIG. 9(b) is a bottom view when viewed from below. FIG. 10 is a cross-sectional view taken along a line X-X of FIG. 9. Further, in the description of the fifth embodiment, the same reference numerals will be given to the configurations overlapping with the laminated all-solid-state secondary battery 311 of the first embodiment the description thereof will be omitted.

As shown in FIGS. 9 and 10, in a laminated all-solid-state secondary battery 315 of this embodiment, an outer positive electrode 365 is attached to the first side surface 321 of the laminated body 320. An outer negative electrode 375 is attached to the second side surface 322 of the laminated body 320.

The outer positive electrode 365 is an electrode having an I-shaped cross-section, does not include the side surface sub-electrode extending to the third side surface 323 and the fourth side surface 324, and does not include the upper surface sub-electrode 361b and the lower surface sub-electrode 361c of the laminated all-solid-state secondary battery 311 of the first embodiment.

The outer negative electrode 375 is an electrode having an I-shaped cross-section, does not include the side surface sub-electrode extending to the third side surface 323 and the fourth side surface 324, and does not include the upper surface sub-electrode 371b and the lower surface sub-electrode 371c of the laminated all-solid-state secondary battery 311 of the first embodiment.

In the laminated all-solid-state secondary battery 315 of this embodiment, the parasitic capacitance of the negative electrode 340 is suppressed at one position between the outer positive electrode 365 and the negative electrode 340 as indicated by an arrow P. Further, the parasitic capacitance of the positive electrode 330 is suppressed at one position between the outer negative electrode 375 and the positive electrode 330 as indicated by an arrow Q. In this way, in the laminated all-solid-state secondary battery 315 of this embodiment, since the generation of the parasitic capacitance is suppressed similarly to the laminated all-solid-state secondary battery 313 of the third embodiment, the pulse discharge cycle characteristics and the charge and discharge capacity are further improved.

According to the above-described laminated all-solid-state secondary batteries 311 to 315 of this embodiment, since the side end portions of the outer positive electrodes 361 to 365 are located at the positions not facing the side end portion of the negative electrode 340 and the side end portions of the outer negative electrodes 371 to 375 are located at the positions not facing the side end portion of the positive electrode 330, the generation of the parasitic capacitance between the side end portions of the outer positive electrode 361 to 365 and the negative electrode 340 and the parasitic capacitance between the side end portions of the outer negative electrodes 371 to 375 and the positive electrode 330 can be suppressed. Therefore, the laminated all-solid-state secondary batteries 311 to 315 of this embodiment improve the charge and discharge capacity and the pulse discharge cycle characteristics.

[Conventional Laminated all-Solid-State Secondary Battery]

First, a conventional laminated all-solid-state secondary battery will be described.

Figure 32:
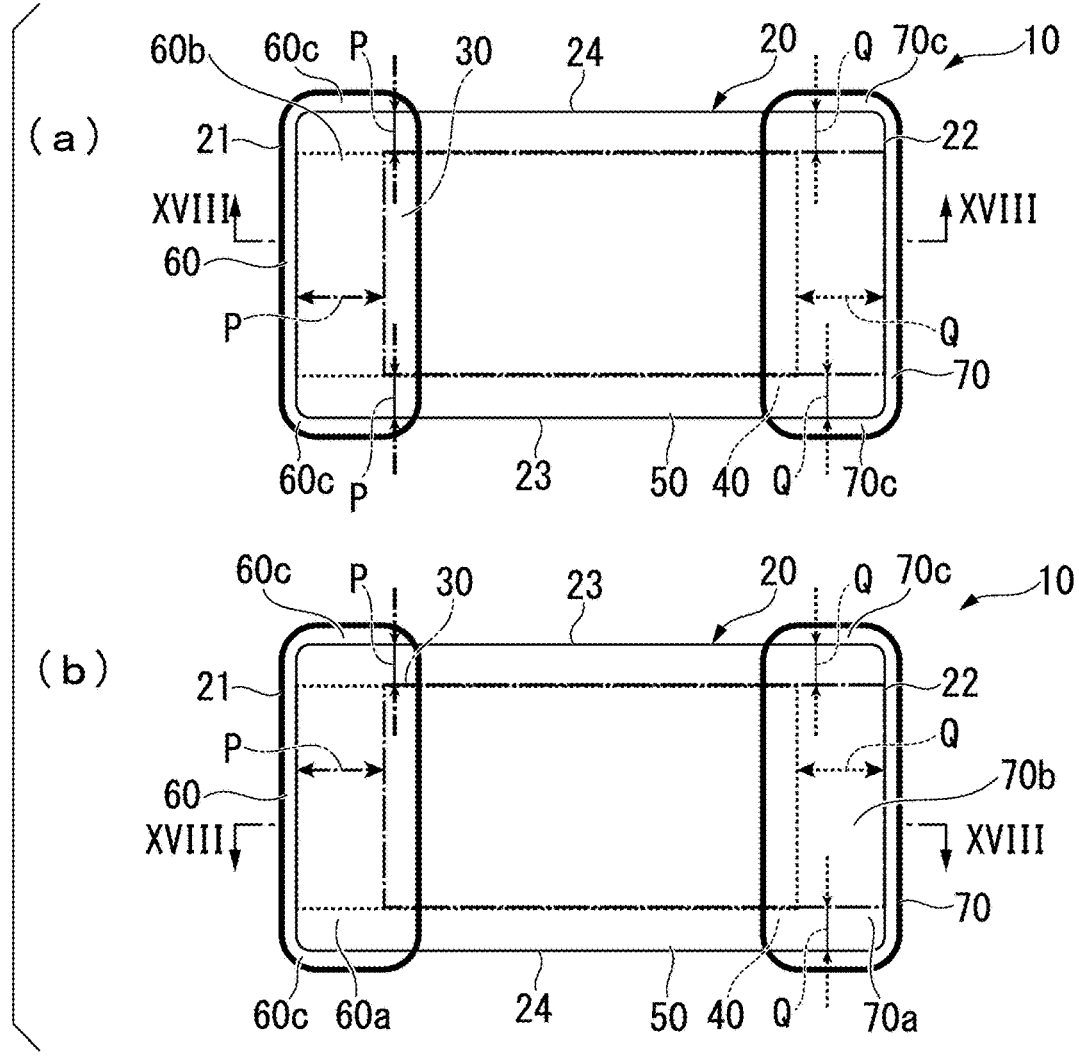
FIG. 32 is a schematic view of a conventional laminated all-solid-state secondary battery, where
Figure 33:
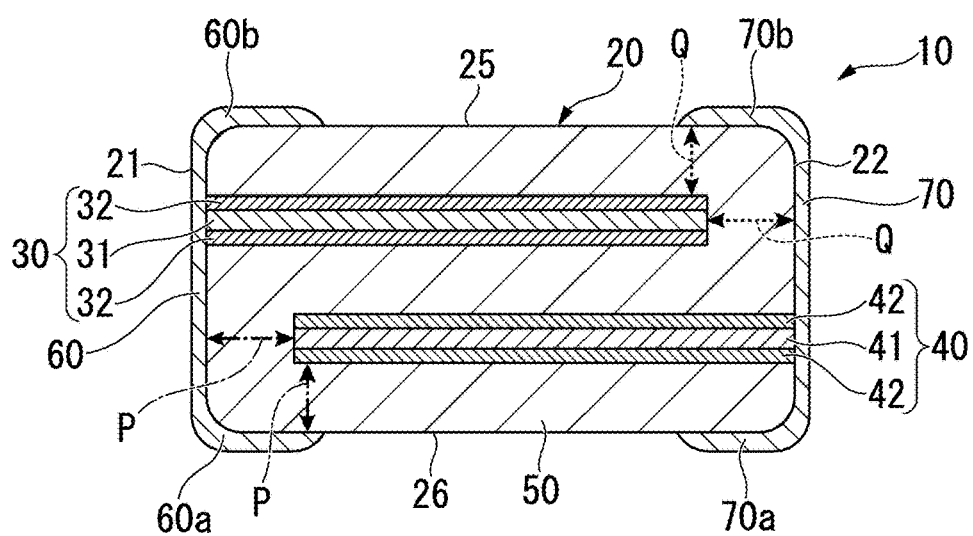
FIG. 33 is a cross-sectional view taken along a line XVIII-XVIII of FIG. 32.

FIG. 32 is a schematic view of the conventional laminated all-solid-state secondary battery, where FIG. 32(a) is a plan view when viewed from above and FIG. 32(b) is a bottom view when viewed from below. FIG. 33 is a cross-sectional view taken along a line XVIII-XVIII of FIG. 32.

As shown in FIGS. 32 and 33, the laminated all-solid-state secondary battery 10 includes a laminated sintered body 20 obtained by sintering the laminated body in which the positive electrode 30 and the negative electrode 40 are laminated with the solid electrolyte layer 50 interposed therebetween. The positive electrode 30 includes a positive electrode current collector layer 31 and a positive electrode active material layer 32. The negative electrode 40 includes a negative electrode current collector layer 41 and a negative electrode active material layer 42. The laminated sintered body 20 is a hexahedron and includes four side surfaces (a first side surface 21, a second side surface 22, a third side surface 23, and a fourth side surface 24) which are formed as surfaces parallel to the laminating direction, an upper surface 25 which is formed on the upper side as a surface orthogonal to the laminating direction, and a lower surface 26 which is formed on the lower side. The positive electrode current collector layer is exposed to the first side surface 21 and the negative electrode current collector layer is exposed to the second side surface 22. The third side surface 23 is a side surface on the right side when viewed from the first side surface 21 with the upper surface 25 facing upward and the fourth side surface 24 is a side surface on the left side when viewed from the first side surface 21 with the upper surface 25 facing upward.

An outer positive electrode 60 electrically connected to the positive electrode current collector layer 31 is attached to the first side surface 21 of the laminated sintered body 20. The outer positive electrode 60 includes a lower surface sub-electrode 60a which extends to the lower surface 26, an upper surface sub-electrode 60b which extends to the upper surface 25, and a side surface sub-electrode 60c which extends to the third side surface 23 and the fourth side surface 24. That is, the outer positive electrode 60 has a U-shaped cross-section and has five surfaces. The end portion of the lower surface sub-electrode 60a (the lower end portion of the outer positive electrode 60) is located at a position facing the negative electrode 40 (the lower surface of the negative electrode 40). The end portion of the upper surface sub-electrode 60b (the upper end portion of the outer positive electrode 60) is located at a position facing the negative electrode 40 (the upper surface of the negative electrode 40). The end portion of the side surface sub-electrode 60c (the side end portion of the outer positive electrode 60) is located at a position facing the negative electrode 40 (the side surface of the negative electrode 40). Here, for example, in the case of the lower surface sub-electrode 60a and the negative electrode 40, the facing position means a position in which the lower surface sub-electrode 60a overlaps the negative electrode 40 when the laminated all-solid-state secondary battery 10 is viewed through.

An outer negative electrode 70 electrically connected to the negative electrode current collector layer 41 is attached to the second side surface 22 of the laminated sintered body 20. The outer negative electrode 70 includes surfaces of a side surface sub-electrode 70c which extends to the third side surface 23 and the fourth side surface 24, an upper surface sub-electrode 70b which extends to the upper surface 25, and a lower surface sub-electrode 70a which extends to the lower surface 26. That is, the outer negative electrode 70 has a U-shaped cross-section and has five surfaces. The end portion of the lower surface sub-electrode 70a (the lower end portion of the outer negative electrode 70) is located at a position facing the positive electrode 30 (the lower surface of the positive electrode 30). The end portion of the upper surface sub-electrode 70b (the upper end portion of the outer negative electrode 70) is located at a position facing the positive electrode 30 (the upper surface of the positive electrode 30). The end portion of the side surface sub-electrode 70c (the side end portion of the outer negative electrode 70) is located at a position facing the positive electrode 30 (the side surface of the positive electrode 30).

In the laminated all-solid-state secondary battery 10, the parasitic capacitance of the negative electrode 40 is suppressed at four positions among the outer positive electrode 60, the lower surface sub-electrode 60a, the side surface sub-electrode 60c, and the negative electrode 40 as indicated by an arrow P. Further, the parasitic capacitance of the positive electrode 30 is generated at four positions among the outer negative electrode 70, the lower surface sub-electrode 70a, the side surface sub-electrode 70c, and the positive electrode 30 as indicated by an arrow Q. For this reason, in the laminated all-solid-state secondary battery 10, the charge and discharge capacity is likely to decrease. Further, in the laminated all-solid-state secondary battery 10, since the outer positive electrode 60 and the outer negative electrode 70 are provided on the outer surface of the laminated sintered body 20, the volume is larger than that of the laminated sintered body 20 and the charge and discharge capacity per unit volume decreases.

Sixth Embodiment

Next, a laminated all-solid-state secondary battery according to a sixth embodiment of the present invention will be described.

Figure 13:
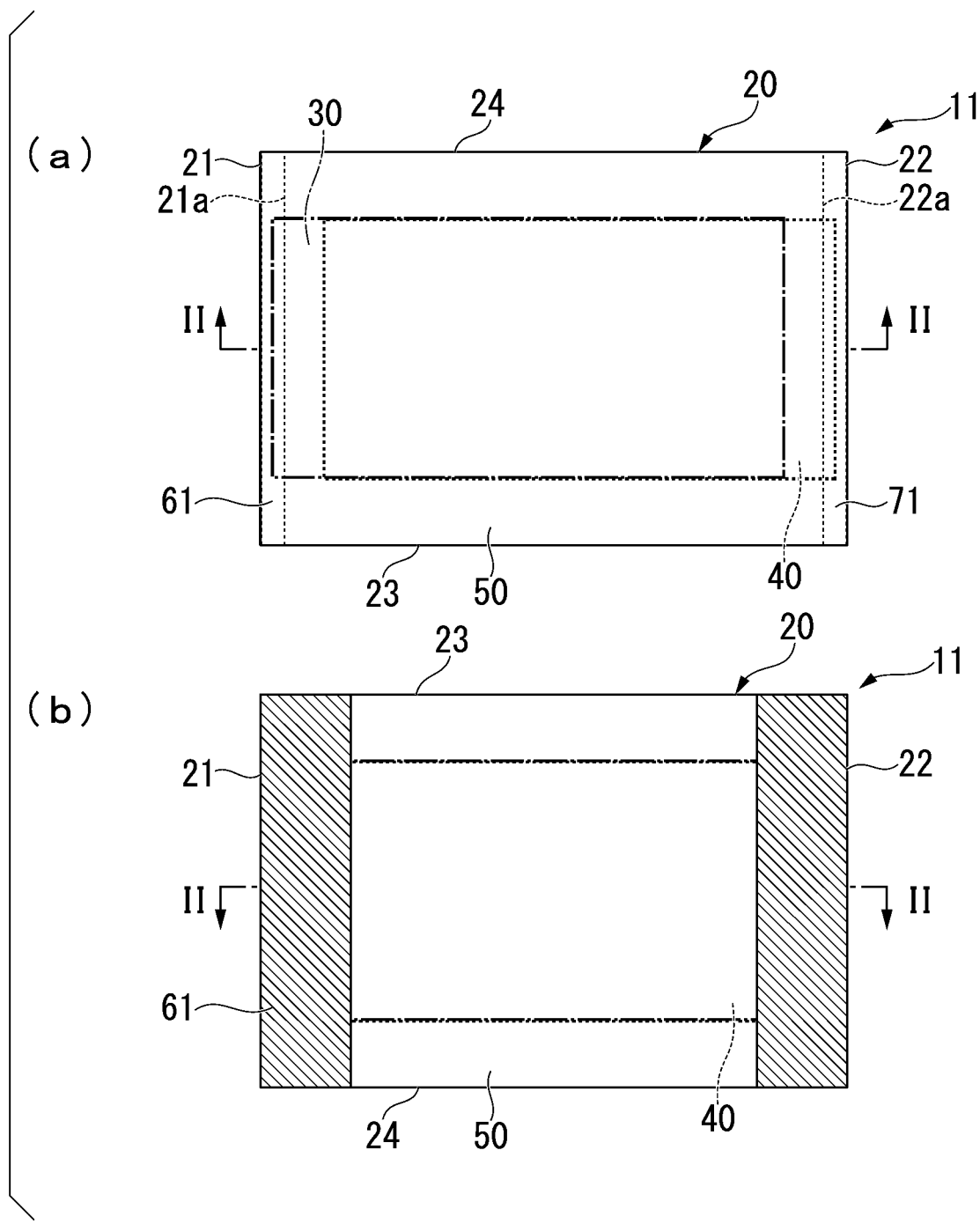
FIG. 13 is a schematic view of a laminated all-solid-state secondary battery according to a sixth embodiment, where
Figure 14:
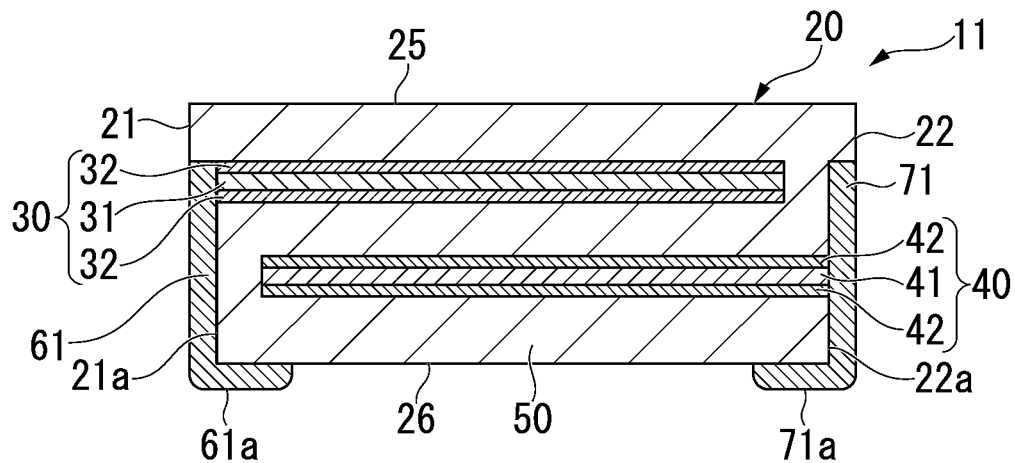
FIG. 14 is a cross-sectional view taken along a line II-II of FIG. 13.

FIG. 13 is a schematic view of the laminated all-solid-state secondary battery according to the sixth embodiment, where FIG. 13(a) is a plan view when viewed from above and FIG. 13(b) is a bottom view when viewed from below. FIG. 14 is a cross-sectional view taken along a line II-II of FIG. 13. Further, in the description of the sixth embodiment, the same reference numerals will be given to the configurations overlapping with the conventional laminated all-solid-state secondary battery 10 and the description thereof will be omitted.

As shown in FIGS. 13 and 14, in the laminated all-solid-state secondary battery 11 of this embodiment, an outer positive electrode 61 is attached to the first side surface 21 of the laminated sintered body 20. The outer positive electrode 61 is formed in the recess 21a provided in the first side surface 21. An outer negative electrode 71 is attached to the second side surface 22 of the laminated sintered body 20. The outer negative electrode 71 is formed in the recess 22a provided in the second side surface 22.

The outer positive electrode 61 is formed as a portion in which the upper end portion (the end portion on the side of the upper surface 25 of the laminated sintered body 20) is in contact with the upper surface of the positive electrode 30. That is, the upper end portion of the outer positive electrode 61 is on the inside (the lower side) of the upper end portion of the laminated sintered body 20 in the laminating direction and the upper end portion of the outer positive electrode 61 does not face the negative electrode 40 (the upper surface of the negative electrode 40). Therefore, the parasitic capacitance is less likely to be generated between the upper end portion of the outer positive electrode 61 and the negative electrode 40. Additionally, the upper end portion of the outer positive electrode 61 may be in the range from a portion which is in contact with the upper surface of the positive electrode 30 to the upper end portion (the upper surface 25) in the laminating direction of the laminated sintered body 20.

The outer positive electrode 61 includes a lower surface sub-electrode 61a which extends to the lower surface 26 in order to facilitate the connection with the circuit board. That is, the outer positive electrode 61 has an L-shaped cross-section and has two surfaces. The outer positive electrode 61 does not include the upper surface sub-electrode 60b and the side surface sub-electrode 60c of the conventional laminated all-solid-state secondary battery 10. Additionally, the outer positive electrode 61 may include the side surface sub-electrode if the end portion of the side surface sub-electrode is located at a position not facing the negative electrode 40. Here, the non-facing position means a position in which the side surface sub-electrode does not overlap the negative electrode 40 when the laminated all-solid-state secondary battery 11 is viewed through.

The outer negative electrode 71 is located at a portion in which the upper end portion (the end portion on the side of the upper surface 25 of the laminated sintered body 20) is in contact with the extension line of the upper surface of the positive electrode 30. That is, the upper end portion of the outer negative electrode 71 is located on the inside of the upper end portion of the laminated sintered body 20 in the laminating direction and the upper end portion of the outer negative electrode 71 does not face the upper surface of the positive electrode 30. Therefore, the parasitic capacitance is less likely to be generated between the upper end portion of the outer negative electrode 71 and the positive electrode 30. Additionally, the upper end portion of the outer negative electrode 71 may be in the range from a portion contacting the extension line of the upper surface of the positive electrode 30 to the upper end portion of the laminated sintered body 20 in the laminating direction.

The outer negative electrode 71 includes a lower surface sub-electrode 71a which extends to the lower surface 26 in order to facilitate the connection with the circuit board. That is, the outer negative electrode 71 has an L-shaped cross-section and two surfaces. The outer negative electrode 71 does not include the upper surface sub-electrode 70b and the side surface sub-electrode 70c of the laminated all-solid-state secondary battery 10. Additionally, the outer negative electrode 71 may include the side surface sub-electrode if the end portion of the side surface sub-electrode is located at a position not facing the positive electrode 30.

In the laminated all-solid-state secondary battery 11 of this embodiment, since the generation of parasitic capacitance is suppressed and the current consumption other than the charge and discharge reaction is reduced compared to the conventional laminated all-solid-state secondary battery 10, the charge and discharge capacity is improved. Further, since the generation of the parasitic capacitance is suppressed, the current distribution associated with the charge and discharge reaction becomes uniform and the cell reaction proceeds uniformly. As a result, the charge and discharge capacity is improved. Further, in the laminated all-solid-state secondary battery 11 of this embodiment, since the outer positive electrode 61 and the outer negative electrode 71 are provided on the inner surface of the laminated sintered body 20, the volume is smaller than that of the laminated all-solid-state secondary battery 10 and the charge and discharge capacity per unit volume increases.

In the laminated all-solid-state secondary battery 11, the materials of the positive electrode current collector layer 31, the positive electrode active material layer 32, the negative electrode current collector layer 41, the negative electrode active material layer 42, the solid electrolyte layer 50, the outer positive electrode 61, and the outer negative electrode 71 are not particularly limited and known materials used in the conventional laminated all-solid-state secondary battery can be used.

As the materials of the positive electrode current collector layer 31 and the negative electrode current collector layer 41, it is preferable to use a material having a large conductivity. Specifically, silver, palladium, gold, platinum, aluminum, copper, nickel, and the like can be used.

The positive electrode active material layer 32 and the negative electrode active material layer 42 include a positive electrode active material and a negative electrode active material that transfer electrons. In addition, a conductive assistant, a binder, or the like may be included. It is preferable that the positive electrode active material and the negative electrode active material can efficiently intercalate and deintercalate lithium ions.

As the positive electrode active material and the negative electrode active material, for example, a transition metal oxide or a transition metal composite oxide is preferably used. Specifically, lithium manganese composite oxide $Li_2Mn_aMa_{1-a}O_3$ ($0.8 \leq a \leq 1$, $Ma=Co, Ni$), lithium cobalt oxide ($LiCoO_2$), lithium nickelate ($LiNiO_2$), lithium manganese spinel ($LiMn_2O_4$), composite metal oxide represented by a general formula: $LiNi_xCo_yMn_zO_2$ ($x+y+z=1$, $0 \leq x \leq 1$, $0 \leq y \leq 1$, $0 \leq z \leq 1$), lithium vanadium compound ($LiV_2O_5$), olivin type $LiMbPO_4$ (here, Mb is one or more elements selected from Co, Ni, Mn, Fe, Mg, Nb, Ti, Al, and Zr), lithium vanadium phosphate ($Li_3V_2(PO_4)_3$ or $LiVOPO_4$), Li excess solid solution represented by $Li_2MnO_3$-$LiMcO_2$($Mc=Mn, Co, Ni$), lithium titanate ($Li_4Ti_5O_{12}$), composite metal oxide represented by $Li_sNi_tCo_uAl_vO_2$ ($0.9<s<1.3$, $0.9<t+u+v<1.1$), and the like can be used.

The positive electrode active material and the negative electrode active material may be selected according to the solid electrolyte described later. For example, when $Li_{1+n}Al_nTi_{2-n}(PO_4)_3$ ($0 \leq n \leq 0.6$) is used as the solid electrolyte, it is preferable to use one or both of $LiVOPO_4$ and $Li_3V_2(PO_4)_3$ for the positive electrode active material and the negative electrode active material. The bonding at the interfaces among the positive electrode active material layer 32, the negative electrode active material layer 42, and the solid electrolyte layer 50 becomes strong. Further, the contact area of the interfaces among the positive electrode active material layer 32, the negative electrode active material layer 42, and the solid electrolyte layer 50 can be widened.

The solid electrolyte layer 50 includes solid electrolyte. As the solid electrolyte, it is preferable to use a material having low electron conductivity and high lithium ion conductivity. Specifically, for example, at least one selected from a group consisting of perovskite type compound such as $La_{0.51}Li_{0.34}TiO_{2.94}$ and $La_{0.5}Li_{0.5}TiO_3$, lysicon type compound such as $Li_{14}Zn(GeO_4)_4$, garnet type compound such as $Li_7La_3Zr_2O_{12}$, nasicon type compound such as $LiZr_2(PO_4)_3$, $Li_{1.3}Al_{0.3}Ti_{1.7}(PO_4)_3$, and $Li_{1.5}Al_{0.5}Ge_{1.5}(PO_4)_3$, thioricicon type compound such as $Li_{3.25}Ge_{0.25}P_{0.75}S_4$ and $Li_3PS_4$, glass compound such as $50Li_4SiO_4 \cdot 50Li_3BO_3$, $Li_2S$—$P_2S_5$, and $Li_2O$—$Li_3O_5$—$SiO_2$, phosphoric acid compound such as $Li_3PO_4$, $Li_{3.5}Si_{0.5}P_{0.5}O_4$, and $Li_{2.9}PO_{3.3}N_{0.46}$, amorphous such as $Li_{2.9}PO_{3.3}N_{0.46}$ (LIPON) and $Li_{3.6}Si_{0.6}P_{0.4}O_4$, and glass ceramics such as $Li_{1.07}Al_{0.69}Ti_{1.46}(PO_4)_3$ and $Li_{1.5}Al_{0.5}Ge_{1.5}(PO_4)_3$ is preferable.

As the materials of the outer positive electrode 61 and the outer negative electrode 71, it is preferable to use a material having a large conductivity. As the conductive material, for example, silver, gold, platinum, aluminum, copper, tin, and nickel can be used.

Figure 15:
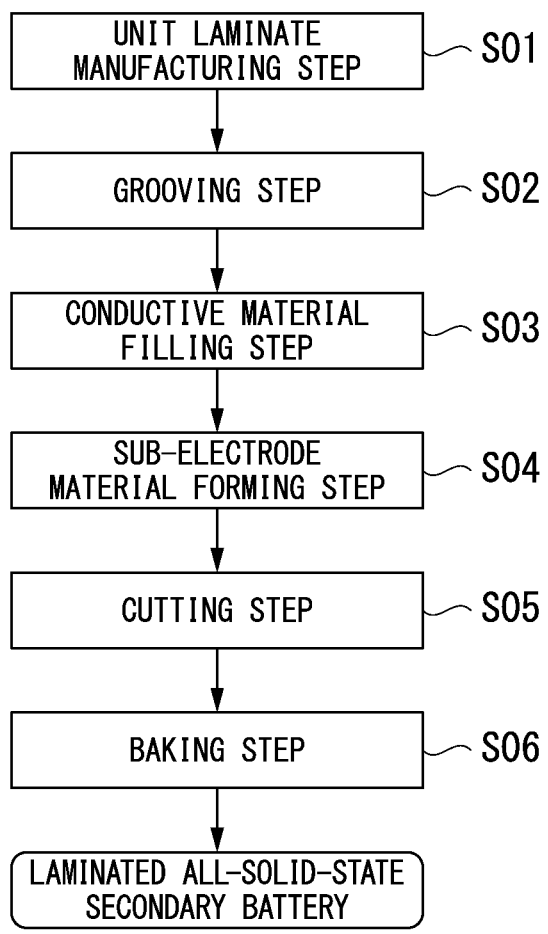
FIG. 15 is a flowchart of a method for manufacturing the laminated all-solid-state secondary battery according to the sixth embodiment.
Figure 16:
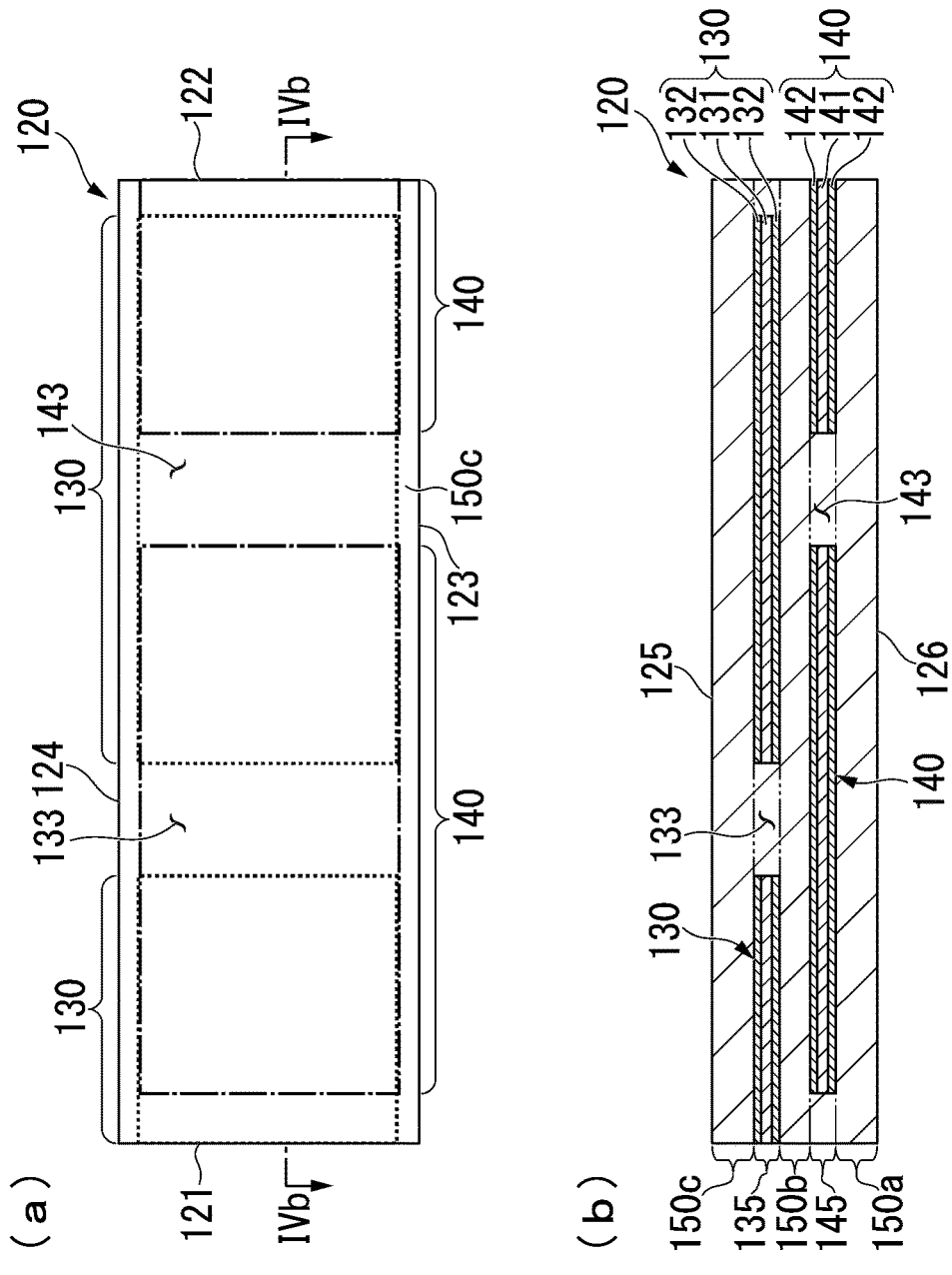
FIG. 16 is a schematic view of a unit laminated body used in the method for manufacturing the laminated all-solid-state secondary battery according to the sixth embodiment, where
Figure 17:
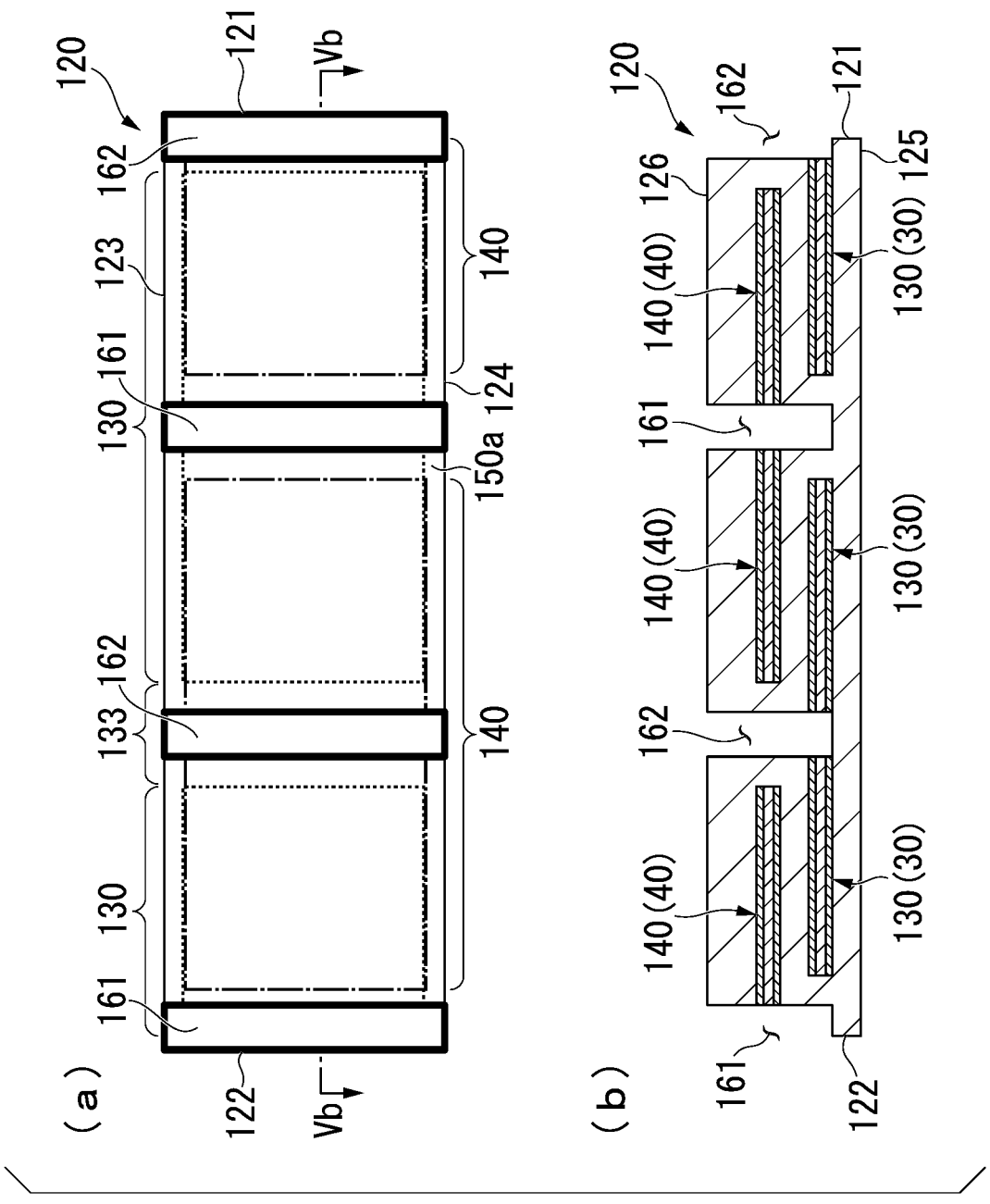
FIG. 17 is a schematic view showing a state in which a groove is provided in the unit laminated body of FIG. 16, where
Figure 18:
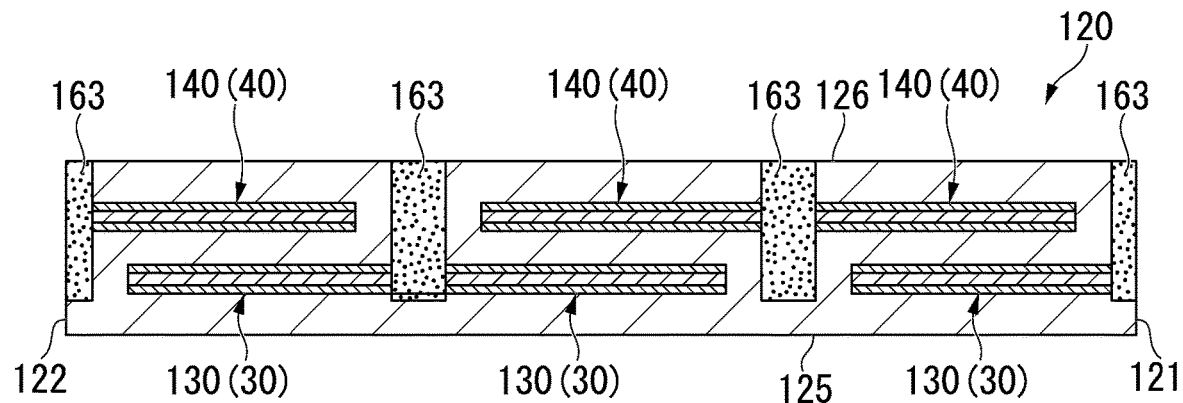
FIG. 18 is a cross-sectional view showing a state in which the groove of the unit laminated body of FIG. 17 is filled with an electrode.
Figure 19:
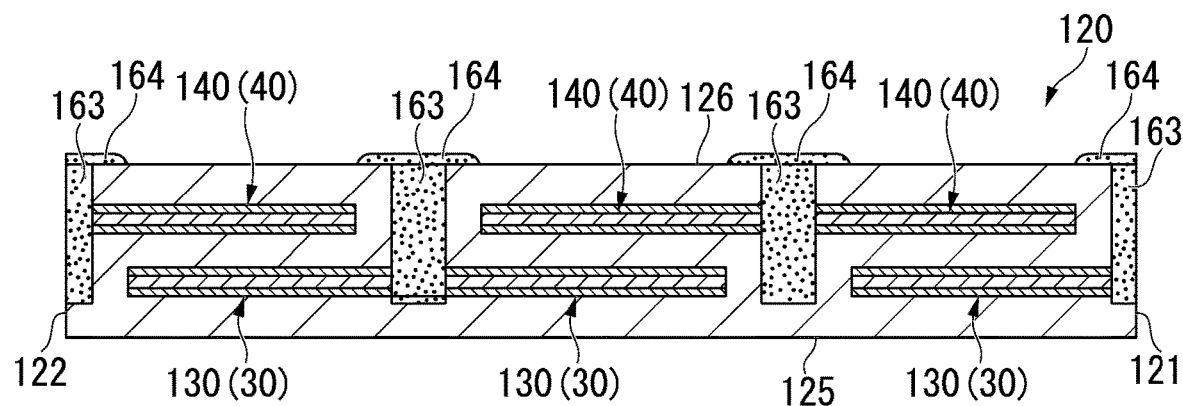
FIG. 19 is a cross-sectional view showing a filled state in which a sub-electrode is connected to the electrode of the unit laminated body of FIG. 18.
Figure 20:
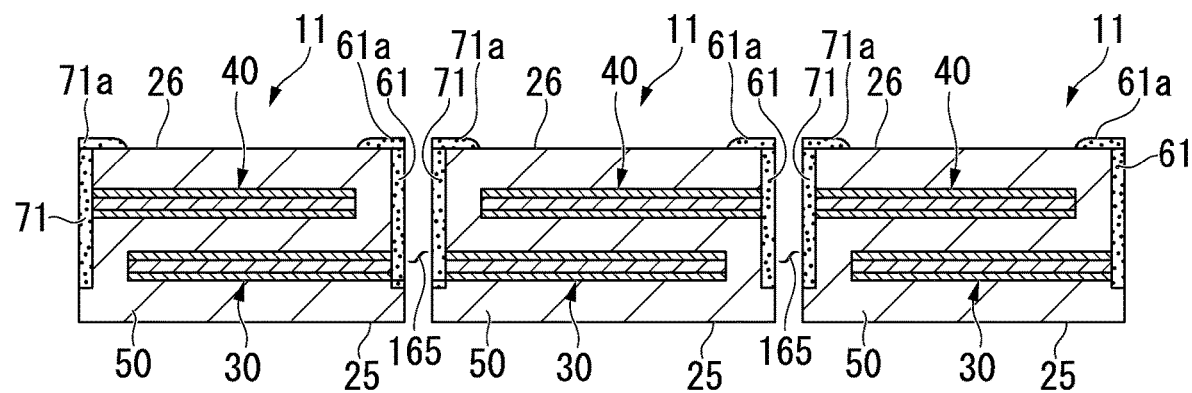
FIG. 20 is a cross-sectional view showing a state in which the unit laminated body of FIG. 19 is cut.

Next, a method for manufacturing the laminated all-solid-state secondary battery 11 of this embodiment will be described with reference to FIGS. 15 to 20. FIG. 15 is a flowchart of a method for manufacturing the laminated all-solid-state secondary battery according to this embodiment. FIG. 16 is a schematic view of the unit laminated body used in the method for manufacturing the laminated all-solid-state secondary battery according to this embodiment, where FIG. 16(a) is a plan view and FIG. 16(b) is a cross-sectional view taken along a line IVb-IVb of FIG. 16(a). FIG. 17 is a schematic view showing a state in which a groove is provided in the unit laminated body of FIG. 16, where FIG. 17(a) is a plan view and FIG. 17(b) is a cross-sectional view taken along a line Vb-Vb of FIG. 17(a). FIG. 18 is a cross-sectional view showing a state in which the groove of the unit laminated body of FIG. 17 is filled with an electrode. FIG. 19 is a cross-sectional view showing a filled state in which a sub-electrode is connected to the electrode of the unit laminated body of FIG. 18. Then, FIG. 20 is a cross-sectional view showing a state in which the unit laminated body is cut.

A method for manufacturing the laminated all-solid-state secondary battery 11 of this embodiment includes, as shown in FIG. 15, a unit laminated body manufacturing step S01, a grooving step S02, a conductive material filling step S03, a sub-electrode forming step S04, a cutting step S05, and a baking step S06.

In the unit laminated body manufacturing step S01, a unit laminated body 120 shown in FIG. 16 is manufactured. The unit laminated body 120 is a laminated body in which a solid electrolyte layer 150a, a negative electrode unit 145, a solid electrolyte layer 150b, a positive electrode unit 135, and a solid electrolyte layer 150c are laminated in this order from the lower surface 126. The unit laminated body 120 is a hexahedron and includes four side surfaces (a first side surface 121, a second side surface 122, a third side surface 123, and a fourth side surface 124) which are formed as surfaces parallel to the laminating direction, an upper surface 125 which is formed on the upper side as a surface orthogonal to the laminating direction, and a lower surface 126 which is formed on the lower side. The positive electrode unit 135 has a configuration in which two or more positive electrodes 130 including a positive electrode current collector layer 131 and a positive electrode active material layer 132 are arranged in parallel with a spacing portion 133 therebetween along the surface direction of the positive electrode 130. The negative electrode unit 145 has a configuration in which two or more negative electrodes 140 including a negative electrode current collector layer 141 and a negative electrode active material layer 142 are arranged in parallel with a spacing portion 143 therebetween along the plane direction of the negative electrode 140. The unit laminated body 120 is laminated so that the spacing portion 133 of the positive electrode unit 135 faces the negative electrode 140 of the negative electrode unit 145 and the spacing portion 133 of the negative electrode unit 145 faces the positive electrode 130 of the positive electrode unit 135. The unit laminated body 120 includes solid electrolyte layers 150a and 150c which are respectively provided on both upper and lower surfaces in the laminating direction.

The unit laminated body 120 can be manufactured according to, for example, a method including a paste preparing step of preparing paste of each member constituting the unit laminated body 120, a unit manufacturing step of manufacturing the positive electrode unit 135 and the negative electrode unit 145 using the manufactured paste, and a laminating step of manufacturing a laminated structure by alternately laminating the positive electrode unit 135 and the negative electrode unit 145 obtained as described above.

<Paste Preparing Step>

In the paste preparing step, each member of the positive electrode current collector layer, the positive electrode active material layer, the solid electrolyte layer, the negative electrode current collector layer, the negative electrode active material layer, the outer electrode is made into paste. The method for making a paste is not particularly limited, but for example, a paste can be prepared by mixing the powder of each member and the vehicle. As a mixing device for preparing the paste, a conventionally known kneading device such as a bead mill, a planetary paste kneader, an automatic grinder, a three-roll mill, a high-share mixer, and a planetary mixer can be used. Here, the vehicle is a general term for a medium in a liquid phase and includes a solvent, a binder, and the like. The binder included in the paste of each member is not particularly limited, but polyvinyl acetal resin, polyvinyl butyral resin, terpineol resin, ethyl cellulose resin, acrylic resin, urethane resin, vinyl acetate resin, polyvinyl alcohol resin, and the like can be used. One of these resins may be used alone, or two or more of these resins may be used in combination.

Further, the paste of each material may include a plasticizer. The type of plasticizer is not particularly limited, but ester phthalates such as dioctyl phthalate and diisononyl phthalate may be used.

By a related method, paste for the positive electrode current collector layer, paste for the positive electrode active material layer, paste for the solid electrolyte layer, paste for the negative electrode active material layer, and paste for the negative electrode current collector layer are prepared.

<Unit Manufacturing Step>

The positive electrode unit 135 can be manufactured as below.

First, the prepared paste for the solid electrolyte layer is applied on a base such as a polyethylene terephthalate (PET) film to a desired thickness and is dried to manufacture a green sheet for the solid electrolyte layer. A method for applying the paste for the solid electrolyte layer is not particularly limited and known methods such as a doctor blade method, a die coater method, a comma coater method, and a gravure coater method can be adopted. Next, the paste for the positive electrode active material layer, the paste for the positive electrode current collector layer, and the paste for the positive electrode active material layer are laminated in this order on the green sheet for the solid electrolyte layer and are dried to form the positive electrode 130 having the positive electrode active material layer 132, the positive electrode current collector layer 131, and the positive electrode active material layer 132 laminated in this order. Further, in order to fill a step between the green sheet for the solid electrolyte layer and the positive electrode, the paste for the solid electrolyte layer is printed on a region (margin) other than the positive electrode by a screen printing method and is dried to form a solid electrolyte layer having a height equivalent to that of the positive electrode. Then, the base is peeled off to obtain the positive electrode unit 135 in which the positive electrode 130 is formed on the green sheet for the solid electrolyte layer.

The negative electrode unit 145 can be manufactured similarly to the method for manufacturing the positive electrode unit except that the paste for the negative electrode active material layer and the paste for the negative electrode current collector layer are used instead of the paste for the positive electrode current collector layer and the paste for the positive electrode active material layer.

<Laminating Step>

In the laminating step, the positive electrode unit and the negative electrode unit are alternately laminated. Accordingly, a laminated structure including the plurality of positive electrode units and the plurality of negative electrode units is manufactured.

Further, the manufactured laminated structures are collectively pressed and crimped with a die press, a hot water isobaric press (WIP), a cold water isobaric press (CIP), a hydrostatic press, and the like so that the adhesion between the positive electrode unit and the negative electrode unit can be improved. Pressurization is preferably performed in a heated state and can be performed, for example, at 40 to 95° C.

Next, in the grooving step S02, as shown in FIG. 17, a first groove 161 cutting the negative electrode 140 through the spacing portion 133 of the positive electrode unit 135 and a second groove 162 cutting the positive electrode 130 through the spacing portion of the negative electrode unit 145 are provided from the side of the lower surface 126 in the laminating direction of the unit laminated body 120.

It is preferable that the first groove 161 and the second groove 162 have the same depth. The depths of the first groove 161 and the second groove 162 are defined as the depth to the interface in which the positive electrode unit 135 is in contact with the solid electrolyte layer 150c on the side of the upper surface 125 in FIG. 17, but may be the depth exceeding the interface.

As a method for forming the groove in the unit laminated body 120, a dicing saw device and a fine laser processing machine can be used.

In the conductive material filling step S03, as shown in FIG. 18, the first groove 161 and the second groove 162 are filled with a conductive material 163. As a method for filling the first groove 161 and the second groove 162 with the conductive material, a method can be used in which the first groove 161 and the second groove 162 are filled with the conductive material paste by screen printing and the conductive material paste is heated and dried.

In the sub-electrode forming step S04, as shown in FIG. 19, a sub-electrode 164 electrically connected to the conductive material 163 is formed on the surface of the lower surface of the unit laminated body 120. It is preferable that the material of the sub-electrode 164 be the same as the material of the conductive material 163.

As a method for forming the sub-electrode 164, a method for applying the conductive material paste and heating and drying the conductive material paste can be used.

In the cutting step S05, as shown in FIG. 20, the unit laminated body 120 is cut in the laminating direction by forming a notch 165 penetrating the unit laminated body 120 in the first groove 161 filled with the conductive material 163 and the second groove 162 filled with the conductive material 163. As a result, a unit laminated body piece (unbaked laminated all-solid-state secondary battery 11) is obtained.

As a method for forming the notch 165 in the unit laminated body 120, a dicing blade and a fine laser processing machine can be used.

In the baking step S06, the unit laminated body piece is baked and sintered to generate the laminated all-solid-state secondary battery 11. The baking condition is, for example, a temperature equal to or higher than 600° C. and equal to or lower than 1000° C. in a nitrogen atmosphere. The baking time is, for example, in the range equal to or longer than 0.1 hour and equal to or shorter than 3 hours. If it is a reducing atmosphere, baking may be performed in, for example, an argon atmosphere or a nitrogen-hydrogen mixed atmosphere instead of the nitrogen atmosphere.

Before the baking step, a debinder treatment can be performed as a step separate from the baking step. By heat-decomposing the binder component included in the unit laminated body piece before baking, it is possible to suppress the rapid decomposition of the binder component in the baking step. The debinder treatment is performed, for example, in a nitrogen atmosphere at a temperature in the range equal to or higher than 300° C. and equal to or lower than 800° C. for 0.1 to 10 hours. If it is a reducing atmosphere, for example, the debinder treatment may be performed in an argon atmosphere or a nitrogen-hydrogen mixed atmosphere instead of the nitrogen atmosphere.

Seventh Embodiment

Next, a laminated all-solid-state secondary battery 12 according to a seventh embodiment of the present invention will be described.

Figure 26:
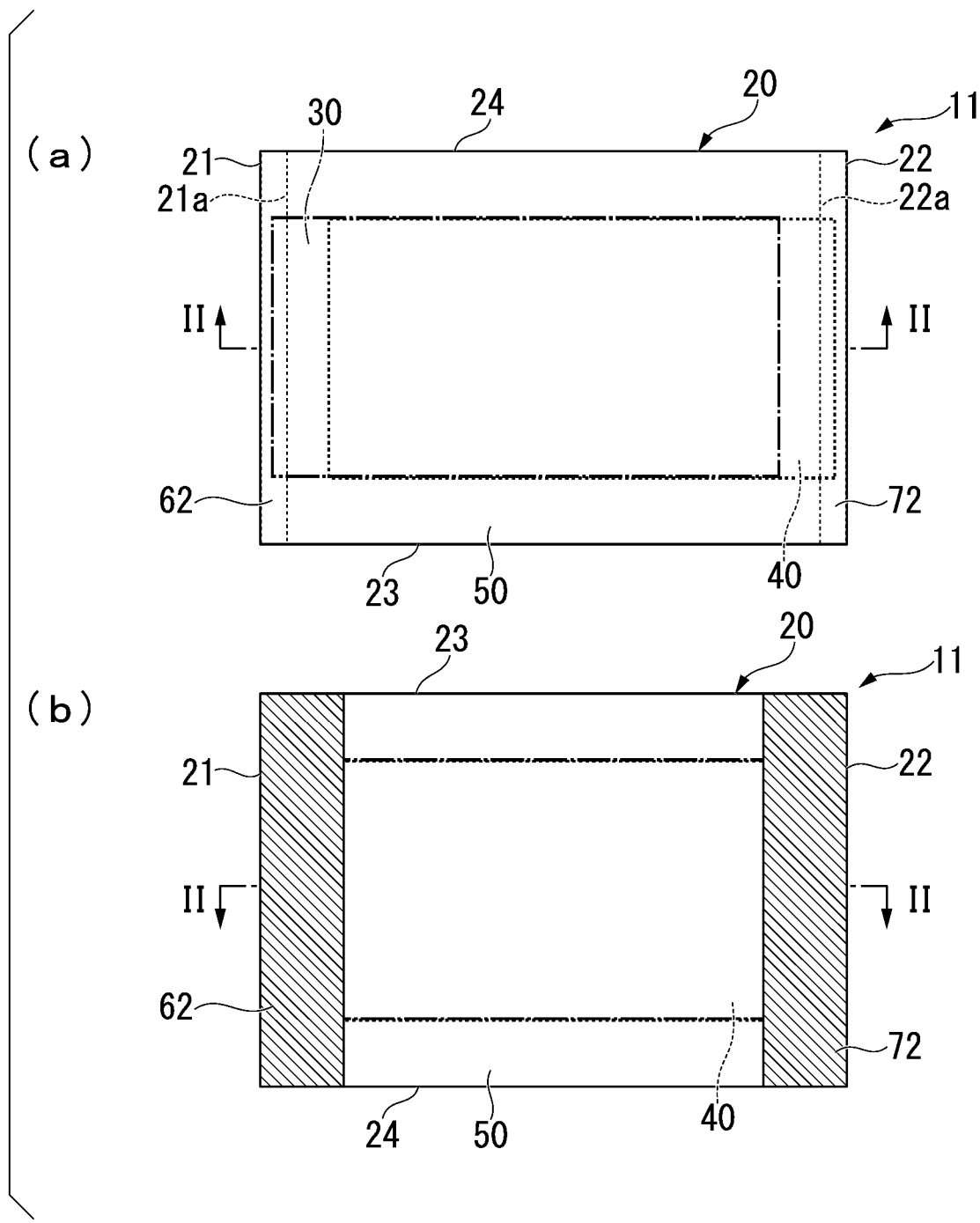
FIG. 26 is a cross-sectional view of a laminated all-solid-state secondary battery according to a seventh embodiment, where
Figure 27:
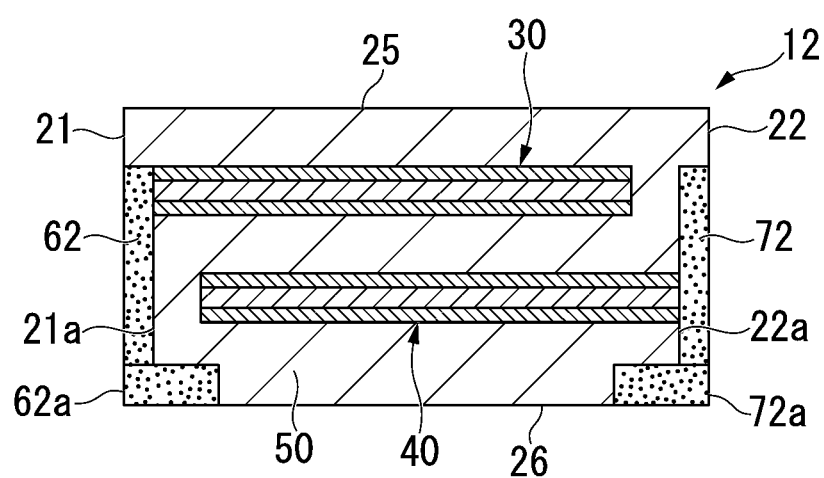
FIG. 27 is a cross-sectional view taken along a line II-II of FIG. 26.

FIG. 26 is a cross-sectional view of the laminated all-solid-state secondary battery according to the seventh embodiment, where FIG. 26(a) is a plan view when viewed from above and FIG. 26(b) is a bottom view when viewed from below. FIG. 27 is a cross-sectional view taken along a line II-II of the laminated all-solid-state secondary battery according to the seventh embodiment. Further, in the description of the seventh embodiment, the same reference numerals will be given to the configurations overlapping with the laminated all-solid-state secondary battery 11 of the sixth embodiment and the description thereof will be omitted.

As shown in FIG. 27, in the laminated all-solid-state secondary battery 12 of this embodiment, an outer positive electrode 62 is attached to the first side surface 21 of the laminated sintered body 20 and an outer negative electrode 72 is attached to the second side surface 22. The outer positive electrode 62 and the outer negative electrode 72 are common to the laminated all-solid-state secondary battery 11 of the sixth embodiment in that they respectively have a lower surface sub-electrode 62a and a lower surface sub-electrode 72a and have an L-shaped cross-section. On the other hand, the laminated all-solid-state secondary battery 12 of this embodiment is different from the laminated all-solid-state secondary battery 11 of the sixth embodiment in that the lower surface sub-electrode 62a and the lower surface sub-electrode 72a are embedded in the lower surface 26 of the laminated sintered body 20.

In the laminated all-solid-state secondary battery 12 of this embodiment, since the lower surface sub-electrode 62a of the outer positive electrode 62 and the lower surface sub-electrode 72a of the outer negative electrode 72 are embedded in the lower surface 26 of the laminated sintered body 20, the volume is smaller than that of the laminated all-solid-state secondary battery 11 of the sixth embodiment. Therefore, a laminated all-solid-state secondary battery 13 of this embodiment improves the volumetric energy density.

Eighth Embodiment

Next, a laminated all-solid-state secondary battery 13 according to an eighth embodiment of the present invention will be described.

Figure 28:
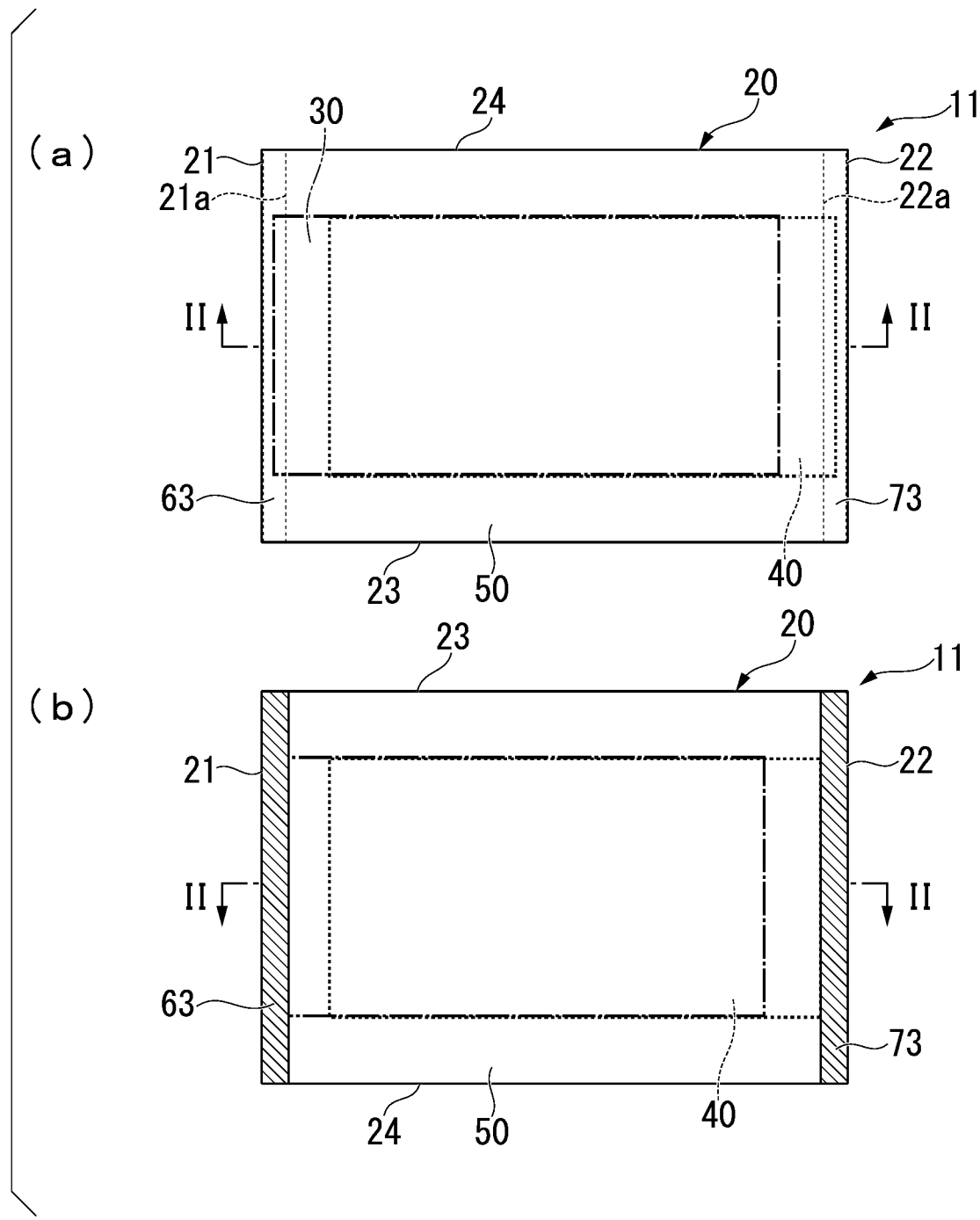
FIG. 28 is a cross-sectional view of a laminated all-solid-state secondary battery according to an eighth embodiment, where
Figure 29:
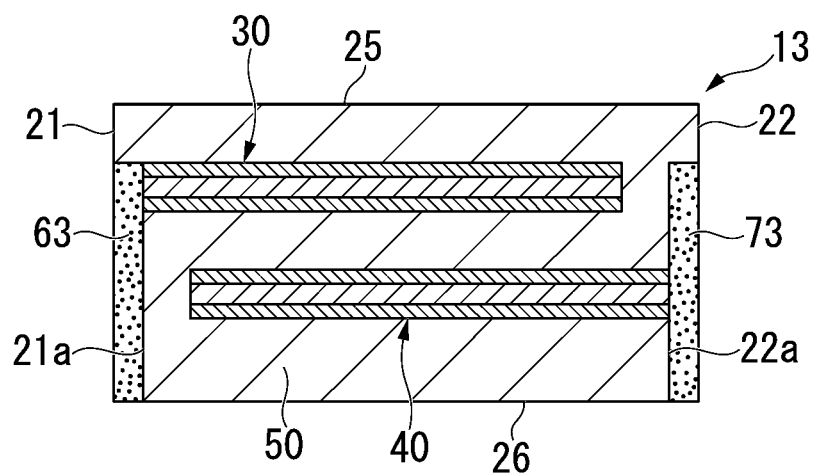
FIG. 29 is a cross-sectional view taken along a line II-II of FIG. 28.

FIG. 28 is a cross-sectional view of the laminated all-solid-state secondary battery according to the eighth embodiment, where FIG. 28(a) is a plan view when viewed from above and FIG. 28(b) is a bottom view when viewed from below. FIG. 29 is a cross-sectional view taken along a line II-II of the laminated all-solid-state secondary battery according to the eighth embodiment. Further, in the description of the eighth embodiment, the same reference numerals will be given to the configurations overlapping with the laminated all-solid-state secondary battery 11 of the sixth embodiment and the description thereof will be omitted.

As shown in FIG. 29, the laminated all-solid-state secondary battery 13 of this embodiment is different from the laminated all-solid-state secondary battery 11 of the sixth embodiment in that each of the outer positive electrode 63 and the outer negative electrode 73 does not include the lower surface sub-electrode.

In the laminated all-solid-state secondary battery 13 of this embodiment, the parasitic capacitance is less likely to be generated between the lower surface sub-electrode 61a of the outer positive electrode 63 and the lower surface of the negative electrode 40. Further, the parasitic capacitance is less likely to be generated between the lower surface sub-electrode 71a of the outer negative electrode 71 and the lower surface of the positive electrode 30. Therefore, the laminated all-solid-state secondary battery 13 of this embodiment improves the charge and discharge capacity.

Ninth Embodiment

Next, a laminated all-solid-state secondary battery 14 according to a ninth embodiment of the present invention will be described.

Figure 30:
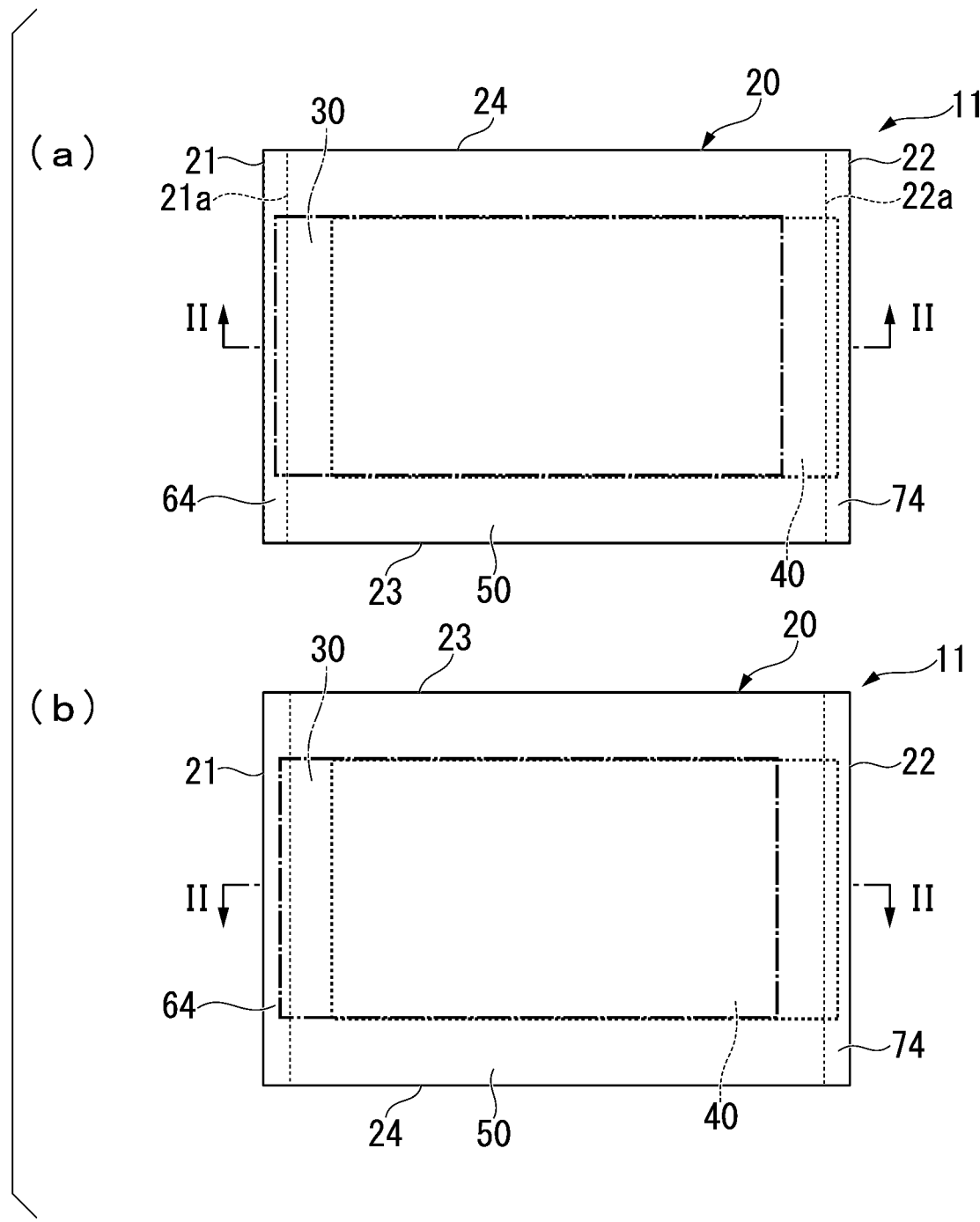
FIG. 30 is a cross-sectional view of a laminated all-solid-state secondary battery according to a ninth embodiment, where
Figure 31:
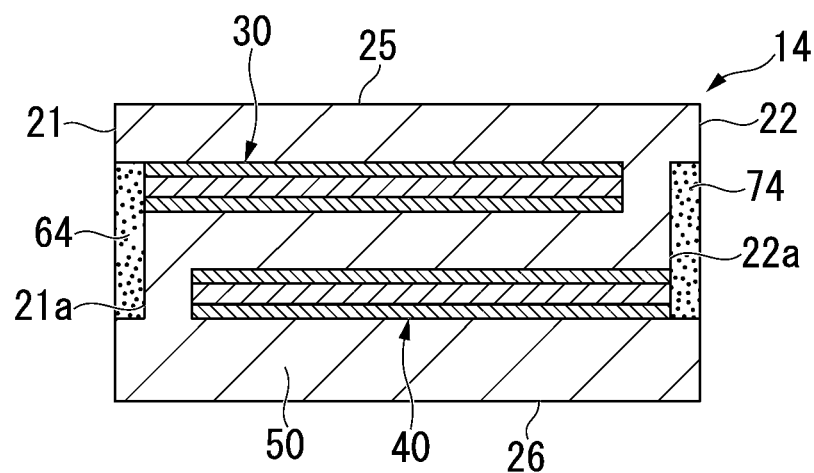
FIG. 31 is a cross-sectional view taken along a line II-II of FIG. 30.

FIG. 30 is a cross-sectional view of the laminated all-solid-state secondary battery according to the ninth embodiment, where FIG. 30(a) is a plan view when viewed from above and FIG. 30(b) is a bottom view when viewed from below. FIG. 31 is a cross-sectional view taken along a line II-II of the laminated all-solid-state secondary battery according to the ninth embodiment. Further, in the description of the ninth embodiment, the same reference numerals will be given to the configurations overlapping with the laminated all-solid-state secondary battery 11 of the sixth embodiment and the description thereof will be omitted.

As shown in FIG. 31, the laminated all-solid-state secondary battery 14 of this embodiment is different from the laminated all-solid-state secondary battery 11 of the sixth embodiment in that the lower end portion of the outer negative electrode 74 is formed as a portion which is in contact with the lower surface of the negative electrode 40 in a portion in which the lower end portion of the outer positive electrode 64 is in contact with the extension line of the lower surface of the negative electrode 40 and the lower end portions of the outer positive electrode 64 and the outer negative electrode 74 are not exposed to the lower surface of the laminated all-solid-state secondary battery 14.

In the laminated all-solid-state secondary battery 14 of this embodiment, the parasitic capacitance is less likely to be generated between the lower portion of the outer negative electrode 74 and the positive electrode 30. In this way, in the laminated all-solid-state secondary battery 14 of this embodiment, since the generation of the parasitic capacitance is further suppressed compared to the laminated all-solid-state secondary battery 11 of the sixth embodiment, the charge and discharge capacity is further improved.

Next, a method for manufacturing the laminated all-solid-state secondary battery 14 of the ninth embodiment will be described. The method for manufacturing the laminated all-solid-state secondary battery 14 of this embodiment includes a unit laminated body manufacturing step S11, a grooving step S12, a conductive material filling step S13, a solid electrolyte layer forming step S14, a cutting step S15, and a baking step S16.

Figure 21:
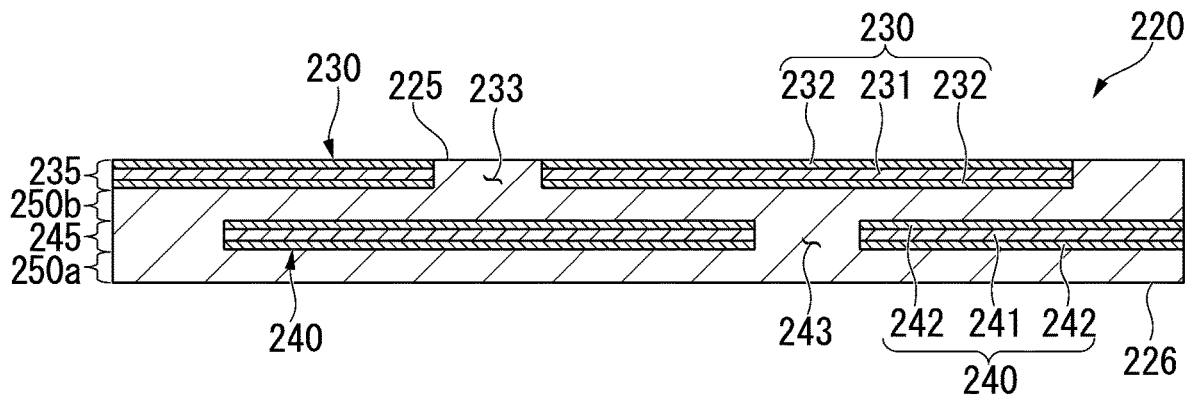
FIG. 21 is a cross-sectional view of a unit laminated body used in a method for manufacturing a laminated all-solid-state secondary battery according to a ninth embodiment.

In the unit laminated body manufacturing step S11, a unit laminated body 220 shown in FIG. 21 is manufactured. The unit laminated body 220 is a laminated body in which the solid electrolyte layer 150*a*, the positive electrode unit 135, the solid electrolyte layer 150*b*, and the negative electrode unit 145 are laminated in this order from the lower surface 226. The unit laminated body 220 is a hexahedron and includes four side surfaces which are formed as surfaces parallel to the laminating direction, an upper surface 225 which is formed on the upper side as a surface orthogonal to the laminating direction, and a lower surface 226 which is formed on the lower side. The positive electrode unit 235 has a configuration in which two or more positive electrodes 230 including a positive electrode current collector layer 231 and a positive electrode active material layer 232 are arranged in parallel with a spacing portion 233 therebetween along the surface direction of the positive electrode 130. The negative electrode unit 245 has a configuration in which two or more negative electrodes 140 including a negative electrode current collector layer 241 and a negative electrode active material layer 242 are arranged in parallel with a spacing portion 143 therebetween along the plane direction of the negative electrode 240. The unit laminated body 220 is laminated so that the spacing portion 233 of the positive electrode unit 235 faces the negative electrode 240 of the negative electrode unit 245 and the spacing portion 133 of the negative electrode unit 145 faces the positive electrode 130 of the positive electrode unit 135. The unit laminated body 220 includes a solid electrolyte layer 250*a* which are provided on the lower surface (the lower surface 226) in the laminating direction.

Figure 22:
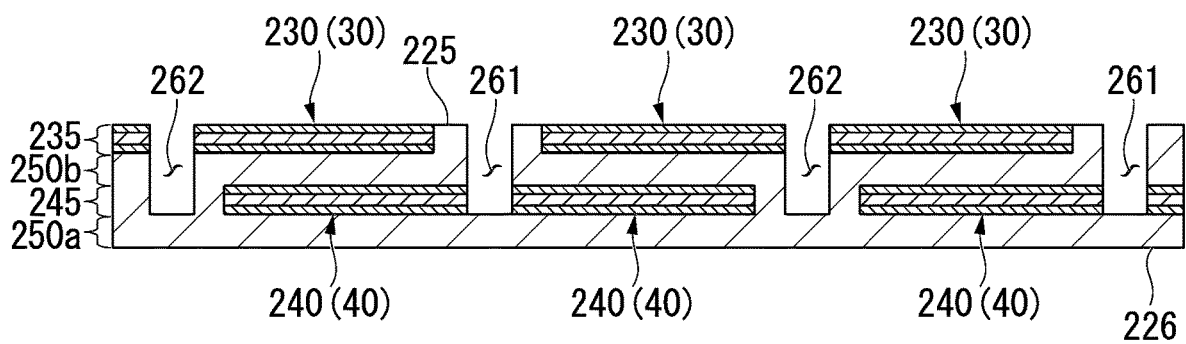
FIG. 22 is a cross-sectional view showing a state in which a groove is provided in the unit laminated body of FIG. 21.

Next, in the grooving step S12, as shown in FIG. 22, a first groove 261 cutting the negative electrode 140 through the spacing portion 233 of the positive electrode unit 235 and a second groove 262 cutting the positive electrode 130 through the spacing portion 243 of the negative electrode unit 245 are provided from the surface (the upper surface 225) on the side opposite to the surface provided with the solid electrolyte layer 250*a* in the laminating direction of the unit laminated body 120.

It is preferable that the first groove 261 and the second groove 262 have the same depth. The depths of the first groove 261 and the second groove 262 are defined as the depth to the interface in which the negative electrode unit 245 is in contact with the solid electrolyte layer 250*a* on the side of the lower surface 226 in FIG. 17, but may be the depth exceeding the interface.

Figure 23:
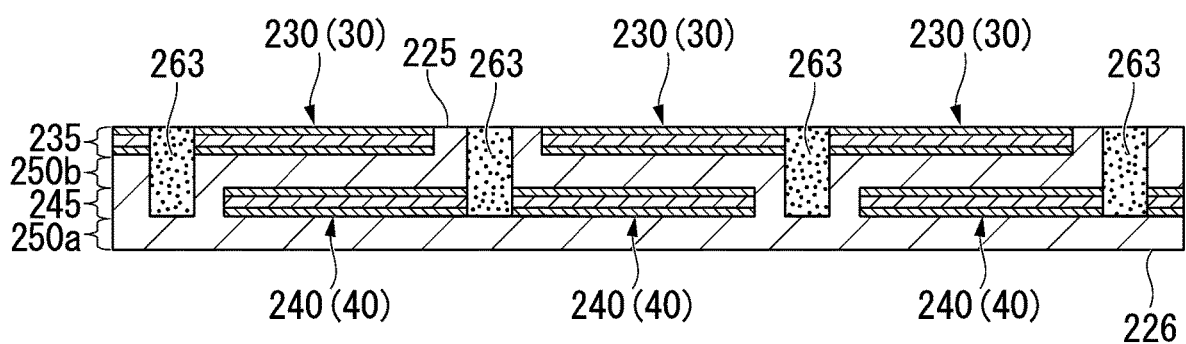
FIG. 23 is a cross-sectional view showing a state in which the groove of the unit laminated body of FIG. 21 is filled with an electrode.

In the conductive material filling step S13, as shown in FIG. 23, the first groove 261 and the second groove 262 are filled with a conductive material 263.

Figure 24:
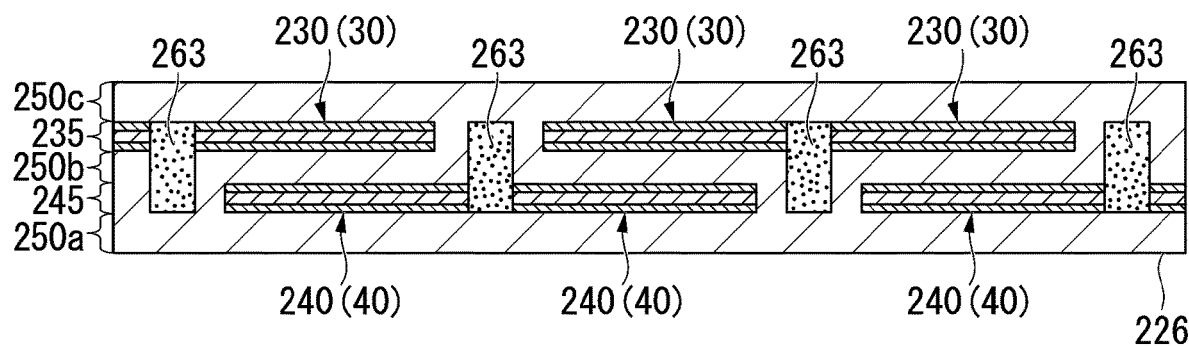
FIG. 24 is a cross-sectional view showing a state in which a solid electrolyte layer is formed on a surface of an upper surface of the unit laminated body of FIG. 23.

In the solid electrolyte layer forming step S14, as shown in FIG. 24, a solid electrolyte layer 250*c* is formed on the surface of the upper surface of the unit laminated body 220. It is preferable that the material of the solid electrolyte layer 250*c* be the same as the materials of the solid electrolyte layer 250*a* and the solid electrolyte layer 250*b*.

As a method for forming the solid electrolyte layer 250*c*, a method can be used in which the solid electrolyte paste is applied and the solid electrolyte paste is heated and dried.

Figure 25:
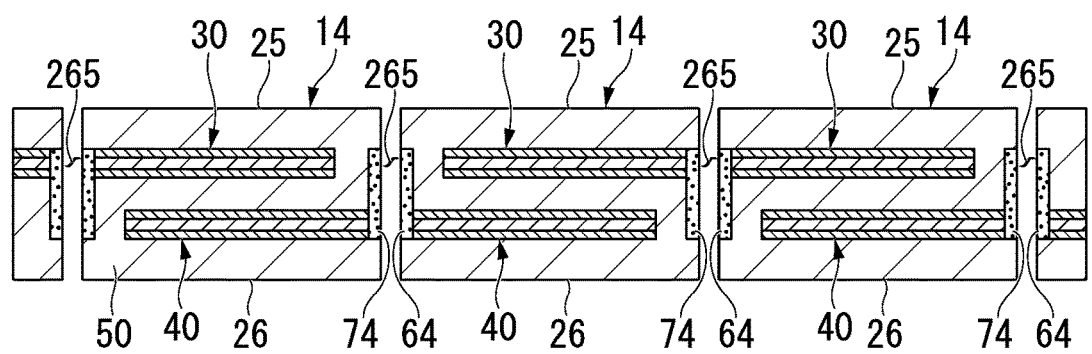
FIG. 25 is a cross-sectional view showing a state in which the unit laminated body of FIG. 24 is cut.

In the cutting step S15, as shown in FIG. 25, the unit laminated body 220 is cut in the laminating direction by forming the notch 165 penetrating the unit laminated body 220 in the first groove 261 filled with the conductive material 263 and the second groove 262 filled with the conductive material 263. Accordingly, a unit laminated body piece (unbaked laminated all-solid-state secondary battery 14) can be obtained.

In the baking step S16, the unit laminated body piece is baked and sintered to generate the laminated all-solid-state secondary battery 14.

According to the laminated all-solid-state secondary batteries 11 to 14 of the above-described sixth to ninth embodiments, since the outer positive electrodes 61, 62, and 64 are on the inside (the lower side) of the upper end portion of the laminated sintered body 20 in the laminating direction, the parasitic capacitance generated between the upper surface sub-electrode 70*b* of the outer negative electrode 70 and the positive electrode 30 in the conventional laminated all-solid-state secondary battery 10 shown in FIG. 33 is avoided in the outer positive electrodes 61, 62, 63, and 64. Similarly, the parasitic capacitance generated between the lower surface sub-electrode 60*a* of the outer positive electrode 60 and the negative electrode 40 in the conventional laminated all-solid-state secondary battery 10 shown in FIG. 33 is avoided in the outer negative electrodes 71, 72, 73, and 74.

Further, according to the laminated all-solid-state secondary batteries of the sixth to ninth embodiments, good bondability can obtained between the outer positive electrode and the positive electrode current collector and between the outer negative electrode and the negative electrode current collector after baking by baking the unbaked laminated all-solid cell in a state in which the outer negative electrode and the negative electrode current collector are well bonded. Accordingly, the cycle characteristics are improved compared to the conventional laminated all-solid-state secondary battery.

Although the embodiments of the present invention have been described in detail with reference to the drawings, each configuration and a combination thereof in each embodiment are examples and the configuration can be added, omitted, replaced, and changed into other forms without departing from the spirit of the present invention.

For example, in the laminated all-solid-state secondary batteries 311 to 315 of the first to fifth embodiments, each of the positive electrode 330 and the negative electrode 340 is one, but the number of the positive electrodes 330 and the negative electrodes 340 is not particularly limited. For example, the plurality of positive electrodes 330 and the plurality of negative electrodes 340 may be respectively alternately laminated. When the plurality of positive electrodes 330 and the plurality of negative electrodes 340 are laminated, it is preferable that the front end portion of the sub-electrode of the outer positive electrode be located at a position not facing the major surface of the negative electrode laminated at a position closest to the sub-electrode in the laminating direction. Further, it is preferable that the front end portion of the sub-electrode of the outer negative electrode be located at a position not facing the major surface of the positive electrode laminated at a position closest to the sub-electrode in the laminating direction. Accordingly, it is possible to suppress the generation of the parasitic capacitance between the sub-electrode of the outer positive electrode and the negative electrode and the parasitic capacitance between the sub-electrode of the outer negative electrode and the positive electrode.

Further, in the laminated all-solid-state secondary batteries 11 to 14 of the sixth to ninth embodiments, each of the positive electrode 30 and the negative electrode 40 is one, but the number of the positive electrodes 30 and the negative electrodes 40 is not particularly limited. For example, the plurality of positive electrodes 30 and the number of negative electrodes 40 may be respectively alternately laminated.

Further, in the laminated all-solid-state secondary batteries 11 to 14 of the sixth to ninth embodiments, the upper end portions (the end portions on the side of the upper surface 25 of the laminated sintered body 20) of the outer positive electrodes 61, 62, and 64 and the outer negative electrodes 71, 72, and 74 are on the inside (the lower side) of the upper end portion of the laminated sintered body 20 in the laminating direction, but the present invention is not limited thereto. The lower end portions (the end portions on the side of the lower surface 26 of the laminated sintered body 20) of the outer positive electrodes 61, 62, and 64 and the outer negative electrodes 71, 72, and 74 may be on the inside (the upper side) of the lower end portion of the laminated sintered body 20 in the laminating direction.

EXAMPLE

Hereinafter, the present invention will be described in more detail with reference to Examples and Comparative Examples based on the above-described embodiments, but the present invention is not limited to these examples. In addition, unless otherwise specified, the indication of "parts" of the amount of the material filled in the preparation of the paste means "parts by mass".

Example 1

<Paste Preparing Step>
(Preparing of Paste for Solid Electrolyte Layer)
As the solid electrolyte powder, $Li_{1.3}Al_{0.3}Ti_{1.7}(PO_4)_3$ powder was used. $Li_{1.3}Al_{0.3}Ti_{1.7}(PO_4)_3$ powder was prepared by the following method.

First, wet mixing was performed with a ball mill using $Li_2CO_3$ powder, $Al_2O_3$ powder, $TiO_2$ powder, and $NH_4H_2PO_4$ powder as starting materials and then dehydration drying was performed to obtain a powder mixture. Next, the obtained powder mixture was calcined in the air to obtain a calcined powder. The obtained calcined powder was subjected to wet-grinding with a ball mill to obtain $Li_{1.3}Al_{0.3}T_{1.7}(PO_4)_3$ powder.

100 parts of ethanol and 200 parts of toluene were added to 100 parts of the above $Li_{1.3}Al_{0.3}Ti_{1.7}(PO_4)_3$ powder as solvents and were wet-mixed with a ball mill. Then, 16 parts of the system binder and 4.8 parts of benzyl butyl phthalate were further added and wet-mixed to prepare paste for a solid electrolyte layer.

(Preparing of Paste for Positive Electrode Active Material Layer and Paste for Negative Electrode Active Material Layer)

$Li_3V_2(PO_4)_3$ powder was used as the positive electrode active material powder and the negative electrode active material powder. $Li_3V_2(PO_4)_3$ powder was prepared by the following method.

First, $Li_2CO_3$ powder, $V_2O_5$ powder, and $NH_4H_2PO_4$ were used as starting materials, were wet-mixed with a ball mill, and then were dehydrated and dried to obtain a powder mixture. Then, the obtained powder mixture was calcined at 850° C. to obtain a calcined powder. The obtained calcined powder was subjected to wet-grinding with a ball mill to obtain $Li_3V_2(PO_4)_3$ powder.

15 parts of a binder and 65 parts of dihydroterpineol as a solvent were added to 100 parts of the $Li_3V_2(PO_4)_3$ powder and were kneaded and dispersed to prepare the paste for the positive electrode active material layer and the paste for the negative electrode active material layer.

(Preparing of Paste for Positive Electrode Current Collector Layer and Paste for Negative Electrode Current Collector Layer)

As the materials of the positive electrode current collector layer and the negative electrode current collector layer, 10 parts of a binder and 50 parts of dihydroterpineol as a solvent were added to 100 parts of Cu powder and were kneaded and dispersed to prepare the paste for the positive electrode current collector layer and the paste for the negative electrode current collector layer.

(Preparing of Conductive Material Paste for Outer Electrode)

20 parts of dihydroterpineol was added as a solvent to 100 parts of Cu powder and was kneaded and dispersed to prepare a conductive material paste for an outer electrode.

Using these pastes, a laminated all-solid-state secondary battery was manufactured as follows.

(Manufacturing of Positive Electrode Unit)

The green sheet for the solid electrolyte layer was formed by applying and drying the paste for the solid electrolyte layer on the PET film as the base material by the doctor blade method. Next, the paste for the positive electrode active material layer, the paste for the positive electrode current collector layer, and the paste for the positive electrode active material layer were printed on the green sheet for the solid electrolyte layer in this order according to the screen printing method to form the green sheet for the positive electrode in which the positive electrode active material layer, the positive electrode current collector layer, and the positive electrode active material layer were laminated in this order. Next, the paste for the solid electrolyte layer was printed in a margin other than the positive electrode according to the screen printing method to form and dry the solid electrolyte layer substantially having the same plane height as that of the positive electrode. Then, the obtained laminated body was peeled off from the PET film to manufacture the positive electrode unit.

(Manufacturing of Negative Electrode Unit)

The negative electrode unit was manufactured similarly to the method for manufacturing the positive electrode unit except that the paste for the negative electrode active material layer and the paste for the negative electrode current collector layer were used instead of the paste for the positive electrode current collector layer and the paste for the positive electrode active material layer.

<Laminating Step>

The plurality of positive electrode units and the plurality of negative electrode units were alternately laminated. Next, the green sheet for the solid electrolyte layer was laminated on both major surfaces of the obtained laminated body as a plurality of layers to obtain a laminated structure. The obtained laminated structure was subjected to thermo-compression bonding by mold pressing.

Additionally, the green sheet for the solid electrolyte layer was manufactured by applying and drying the paste for the solid electrolyte layer on the PET film according to the doctor blade method.

<Cutting Step/Baking Step>

The obtained laminated structure was cut so that the positive electrode current collector layer is exposed from one end surface and the negative electrode current collector layer is exposed from the single surface on the side opposite to that end surface. Next, the cut laminated structure was baked at 800° C. for 1 hour to obtain the laminated body 320. The size of the obtained laminated body 320 was 5.5 mm in length×4.0 mm in width×1.0 mm in thickness.

<Outer Electrode Forming Step>

Conductive Cu paste for the outer electrode was applied to the entire surfaces of the first side surface 321 and the second side surface 322 of the laminated body 320 obtained by the baking step, the range of 1 mm from the end portion of the upper surface 325 on the side of the first side surface 321, the range of 1 mm from the end portion thereof on the side of the second side surface 322, the range of 1 mm from the end portion of the lower surface 326 on the side of the first side surface 321, and the range of 1 mm from the end portion thereof on the side of the second side surface 322 according to the screen printing method and was burned at 500° C. in a reducing atmosphere. Additionally, conductive Cu paste for the outer electrode was not applied to the third side surface 323 and the fourth side surface 324 of the laminated body 320. In this way, the laminated all-solid-state secondary battery 311 according to the first embodiment in which the upper surface sub-electrodes 361b and 371b and the lower surface sub-electrodes 361c and 371c were provided and the outer positive electrode 361 and the outer negative electrode 371 had a U-shaped cross-section was manufactured.

Example 2

The laminated all-solid-state secondary battery 312 according to the second embodiment in which the outer positive electrode 362 and the outer negative electrode 372 had an L-shaped cross-section was manufactured similarly to Example 1 except that conductive Cu paste for the outer electrode was not applied to the upper surface 325 of the laminated body 320.

Example 3

The laminated all-solid-state secondary battery 313 according to the third embodiment in which the outer positive electrode 363 and the outer negative electrode 373 had a U-shaped cross-section were manufactured similarly to Example 1 except that the application range of conductive Cu paste for the outer electrode of the upper surface 325 of the laminated body 320 was in the range of 0.4 mm from the end portion on the side of the first side surface 321 and the range of 0.4 mm from the end portion on the side of the second side surface 322 and the application range of conductive Cu paste for the outer electrode of the lower surface 326 of the laminated body 320 was in the range of 0.4 mm from the end portion on the side of the first side surface 321 and the range of 0.4 mm from the end portion on the side of the second side surface 322.

Example 4

The laminated all-solid-state secondary battery 314 according to the fourth embodiment in which the outer positive electrode 364 and the outer negative electrode 374 had an L-shaped cross-section was manufactured similarly to Example 1 except that conductive Cu paste for the outer electrode was not applied to the upper surface 325 of the laminated body 320 and the application range of conductive Cu paste for the outer electrode of the lower surface 326 of the laminated body 320 was in the range of 0.4 mm from the end portion on the side of the first side surface 321 and the range of 0.4 mm from the end portion on the side of the second side surface 322.

Example 5

The laminated all-solid-state secondary battery 315 according to the fifth embodiment in which the outer positive electrode 365 and the outer negative electrode 375 had an I-shaped cross-section was manufactured similarly to Example 1 except that conductive Cu paste for the outer electrode was not applied to the upper surface 325 and the lower surface 326 of the laminated body 320.

Comparative Example 1

The conventional laminated all-solid-state secondary battery 310 shown in FIGS. 11 and 12 were manufactured similarly to Example 1 except that conductive Cu paste for the outer electrode was applied to the range of 1 mm from the end portion on the side of the first side surface 321 in the third side surface 323 and the fourth side surface of the laminated body 320 and the range of 1 mm from the end portion on the side of the second side surface 322 by the dip coating method and was dried to form the side surface sub-electrodes 360a and 370a on the third side surface 323 and the fourth side surface of the laminated body 320.

[Evaluation]

The first charge and discharge capacity, the pulse discharge cycle characteristics, the charge and discharge cycle characteristics, and the mounted shear strength for the laminated all-solid-state secondary batteries manufactured by Examples 1 to 5 and Comparative Example 1 were measured by the following method. The results are shown in Table 1 below together with the structures of the positive and outer negative electrodes and the number of electrode surfaces.

<First Charge and Discharge Capacity>

The first charge and discharge capacity was measured in an environment of 25° C. In the charge capacity, a constant current of 0.1 C was applied until the cell voltage reached 1.6 V and the capacity when held for 3 hours was measured. The discharge capacity was measured by charging and then discharging at a constant current of 0.2 C until the cell voltage reached 0 V. Table 1 shows one discharge capacity (the first discharge capacity). Additionally, the discharge capacity is a relative value when the discharge capacity of the laminated all-solid-state secondary battery manufactured by Comparative Example 1 is 100.

<Pulse Discharge Cycle Characteristics>

In the pulse discharge cycle characteristics, the number of pulse discharge cycles was measured by charging at the same charging condition as that of the first charge and discharge capacity in an environment of 25° C., discharging for 1 second with a large current of 20 C, and repeating the pause for 59 seconds until the cell voltage reached 1.2V.

<Charge and Discharge Cycle Characteristics>

The measurement of the first charge and discharge capacity was defined as one cycle and the charge and discharge capacity retention rate after repeating this up to 1000 cycles was evaluated as the charge and discharge cycle characteristics. The charge and discharge cycle characteristics in this embodiment were calculated by the following formula.

Charge and discharge capacity retention rate [%] after 1000 cycles=(discharge capacity after 1000 cycles÷first discharge capacity)×100

<Mounted Shear Strength>

The laminated all-solid-state secondary battery manufactured in Examples and Comparative Examples was mounted on a land electrode on a glass epoxy substrate and reflow-soldered to mount the cell on the glass epoxy substrate. The mounted laminated all-solid-state secondary battery was subjected to stress from the side by operating a load cell at a speed of 0.15 mm/s from the side surface of the laminated all-solid-state secondary battery using a shear strength tester so that the laminated all-solid-state secondary battery was peeled off from the glass epoxy substrate and the stress applied when the laminated all-solid-state secondary battery was peeled off from the glass epoxy substrate was measured as the mounted shear strength.

TABLE 1

| | CROSS-SECTIONAL SHAPE OF OUTER ELECTRODE | FIRST DISCHARGE CAPACITY [RELATIVE VALUE] | DISCHARGE CAPACITY RETENTION RATE [%]/1000 CYCLES | NUMBER OF PULSE DISCHARGE CYCLES [20 C/1 SEC] | MOUNTED SHEAR STRENGTH [N] |
|---|---|---|---|---|---|
| COMPARATIVE EXAMPLE 1 | U-SHAPE | 100 | 82 | 40 | 6.8 |
| EXAMPLE 1 | U-SHAPE | 103 | 91 | 46 | 6.7 |
| EXAMPLE 2 | L-SHAPE | 105 | 92 | 50 | 6.6 |
| EXAMPLE 3 | U-SHAPE | 104 | 92 | 47 | 6.5 |
| EXAMPLE 4 | L-SHAPE | 106 | 93 | 53 | 6.5 |
| EXAMPLE 5 | I-SHAPE | 107 | 93 | 55 | 3.2 |

In the laminated all-solid-state secondary batteries of Examples 1 to 5 in which the side end portions (the side surface sub-electrodes 361a to 365a) of the outer positive electrodes 361 to 365 were located at the positions not facing the side end portion of the negative electrode 340 and the side end portions (the side surface sub-electrodes 371a to 375a) of the outer negative electrodes 371 to 375 were located at the positions not facing the side end portion of the positive electrode 330, all of the first charge and discharge capacity, the pulse discharge cycle characteristics, and the charge and discharge cycle characteristics were improved as compared with the laminated all-solid-state secondary battery of Comparative Example 1.

Particularly, in the laminated all-solid-state secondary batteries of Examples 3 to 5 in which the upper end portions and the lower end portions of the outer positive electrodes 363 to 365 were located at the positions not facing the negative electrode 340 and the upper end portions and the lower end portions of the outer negative electrodes 373 to 375 were located at the positions not facing the positive electrode 330, all of the first charge and discharge capacity, the pulse discharge cycle characteristics, and the charge and discharge cycle characteristics were improved. However, in the laminated all-solid-state secondary battery of Example 5 without the upper surface sub-electrode and the lower surface sub-electrode, the mounted shear strength was lowered.

Example 6

<Paste Preparing Step>
(Preparing of Paste for Solid Electrolyte Layer)

As the solid electrolyte powder, $Li_{1.3}Al_{0.3}Ti_{1.7}(PO_4)_3$ powder was used. $Li_{1.3}Al_{0.3}Ti_{1.7}(PO_4)_3$ powder was prepared by the following method.

First, wet mixing was performed with a ball mill using $Li_2CO_3$ powder, $Al_2O_3$ powder, $TiO_2$ powder, and $NH_4H_2PO_4$ powder as starting materials and then dehydration drying was performed to obtain a powder mixture. Next, the obtained powder mixture was calcined in the air to obtain a calcined powder. The obtained calcined powder was subjected to wet-grinding with a ball mill to obtain $Li_{1.3}Al_{0.3}T_{1.7}(PO_4)_3$ powder.

100 parts of ethanol and 200 parts of toluene were added to 100 parts of the above $Li_{1.3}Al_{0.3}T_{1.7}(PO_4)_3$ powder as solvents and were wet-mixed with a ball mill. Then, 16 parts of the system binder and 4.8 parts of benzyl butyl phthalate were further added and wet-mixed to prepare paste for a solid electrolyte layer.

(Preparing of Paste for Positive Electrode Active Material Layer and Paste for Negative Electrode Active Material Layer)

$Li_3V_2(PO_4)_3$ powder was used as the positive electrode active material powder and the negative electrode active material powder.

$Li_3V_2(PO_4)_3$ powder was prepared by the following method.

First, $Li_2CO_3$ powder, $V_2O_5$ powder, and $NH_4H_2PO_4$ were used as starting materials, were wet-mixed with a ball mill, and then were dehydrated and dried to obtain a powder mixture. Then, the obtained powder mixture was calcined at 850° C. to obtain a calcined powder. The obtained calcined powder was subjected to wet-grinding with a ball mill to obtain $Li_3V_2(PO_4)_3$ powder.

parts of a binder and 65 parts of dihydroterpineol as a solvent were added to 100 parts of the $Li_3V_2(PO_4)_3$ powder and were kneaded and dispersed to prepare the paste for the positive electrode active material layer and the paste for the negative electrode active material layer.

(Preparing of Paste for Positive Electrode Current Collector Layer and Paste for Negative Electrode Current Collector Layer)

As the materials of the positive electrode current collector layer and the negative electrode current collector layer, 10 parts of a binder and 50 parts of dihydroterpineol as a solvent were added to 100 parts of Cu powder and were kneaded and dispersed to prepare the paste for the positive electrode current collector layer and the paste for the negative electrode current collector layer.

(Preparing of Conductive Material Paste for Outer Electrode)

20 parts of dihydroterpineol was added as a solvent to 100 parts of Cu powder and was kneaded and dispersed to prepare a conductive material paste for an outer electrode.

Using these pastes, a laminated all-solid-state secondary battery was manufactured as follows.

(Manufacturing of Positive Electrode Unit)

The green sheet for the solid electrolyte layer was formed by applying and drying the paste for the solid electrolyte layer on the PET film as the base material by the doctor blade method. Next, the paste for the positive electrode active material layer, the paste for the positive electrode current collector layer, and the paste for the positive electrode active material layer were printed on the green sheet for the solid electrolyte layer in this order according to the screen printing method to form the green sheet for the positive electrode in which the positive electrode active material layer, the positive electrode current collector layer, and the positive electrode active material layer were laminated in this order. Next, the paste for the solid electrolyte layer was printed in a margin other than the positive electrode according to the screen printing method to form and dry the solid electrolyte layer substantially having the same plane height as that of the positive electrode. Then, the obtained laminated body was peeled off from the PET film to manufacture the positive electrode unit.

(Manufacturing of Negative Electrode Unit)

The negative electrode unit was manufactured similarly to the manufacturing of the positive electrode unit except that the paste for the negative electrode active material layer and the paste for the negative electrode current collector layer were used instead of the paste for the positive electrode current collector layer and the paste for the positive electrode active material layer.

<Unit Laminated Body Manufacturing Step>

The plurality of positive electrode units and the plurality of negative electrode units were alternately laminated. Next, the green sheet for the solid electrolyte layer was laminated on both major surfaces of the obtained laminated body as a plurality of layers to obtain a unit laminated body. The obtained unit laminated body was subjected to thermocompression bonding by mold pressing.

Additionally, the green sheet for the solid electrolyte layer was manufactured by applying and drying the paste for the solid electrolyte layer on the PET film according to the doctor blade method.

<Grooving Step>

Next, as shown in FIG. 17, the first groove 161 and the second groove 162 were formed from the upper surface side of the obtained unit laminated body 120 by a fine laser processing machine.

<Conductive Material Filling Step>

Next, as shown in FIG. 18, the first groove 161 and the second groove 162 were filled with conductive material paste for the outer electrode according to a screen printing method and were dried. In this way, the first groove 161 and the second groove 162 were filled with the conductive material. In addition, when the grooves were not sufficiently filled with the conductive material paste for the outer electrode by one screen printing, screen printing was performed a plurality of times.

<Sub-Electrode Forming Step>

Next, as shown in FIG. 19, the conductive material paste for the outer electrode was printed on the surface of the upper surface of the unit laminated body 120 according to the screen printing method and was dried to form the sub-electrode 164.

<Cutting Step>

Next, as shown in FIG. 20, the notch 165 penetrating the unit laminated body 120 was formed in the first groove 161 and the second groove 162 filled with the conductive material 163 by a fine laser processing machine to obtain a unit laminated body piece (unbaked laminated all-solid-state secondary battery).

<Baking Step>

Then, the obtained unit laminated body piece was heated to 750° C. at a heating rate of 200° C./hour in a nitrogen atmosphere, was baked for 2 hours at that temperature, and then was cooled to a room temperature. The size of the laminated all-solid-state secondary battery 11 obtained after baking was 5.50 mm×4.00 mm×1.02 mm.

Example 7

The laminated all-solid-state secondary battery 12 according to the seventh embodiment was manufactured similarly to Example 6 except that a groove was provided around the first groove 161 and the second groove 162 filled with the conductive material 163 of the unit laminated body 120 by a fine laser processing machine before the sub-electrode forming step and a sub-electrode was formed in the groove in the sub-electrode forming step. Additionally, the size of the laminated all-solid-state secondary battery 12 obtained after baking was 5.50 mm×4.00 mm×1.00 mm. In the laminated all-solid-state secondary battery 12 obtained in Example 7, since the sub-electrode was formed in the groove, the height was lowered by 0.02 mm compared to the laminated all-solid-state secondary battery 11 obtained by Example 6.

Example 8

The laminated all-solid-state secondary battery 13 according to the eighth embodiment was manufactured similarly to Example 6 except that the sub-electrode was not formed. Additionally, the size of the laminated all-solid-state secondary battery 13 obtained after baking was 5.50 mm×4.00 mm×1.00 mm. Since the laminated all-solid-state secondary battery 13 obtained in Example 8 was not provided with the sub-electrode, the height was lowered by 0.02 mm compared to the laminated all-solid-state secondary battery 11 obtained by Example 6.

Example 9

The laminated all-solid-state secondary battery 14 according to the ninth embodiment was manufactured similarly to Example 6 except that the solid electrolyte layer was not formed on the upper surface 225 after manufacturing the unit laminated body 220 as shown in FIG. 24 in the unit laminated body manufacturing step and the solid electrolyte layer 250c was formed on the surface of the upper surface of the unit laminated body 220 as shown in FIG. 27 (the solid electrolyte layer forming step) without performing the sub-electrode forming step after the conductive material filling step. Additionally, the size of the laminated all-solid-state secondary battery 14 obtained after baking was 5.50 mm×4.00 mm×1.00 mm.

Comparative Example 2

The unit laminated body obtained by the unit laminated body manufacturing step of Example 6 was cut and the obtained unit laminated body piece was baked to obtain the laminated sintered body 20 shown in FIGS. 29 and 30. The size of the laminated sintered body 20 was 5.50 mm×4.00 mm×1.00 mm.

The first side surface 21 of the laminated sintered body 20 was immersed into the conductive material paste for the outer electrode used in Example 6 to a depth facing the negative electrode 40 so that the conductive material paste for the outer electrode was applied to the first side surface 21. Next, the second side surface 22 of the laminated sintered body 20 was immersed into the conductive material paste for the outer electrode to a depth facing the positive electrode 30 so that the conductive material paste for the outer electrode was applied to the second side surface 22. The applied conductive material paste for the outer electrode was dried to manufacture the conventional laminated all-solid-state secondary battery 10 shown in FIGS. 29 and 30. Additionally, the size of the obtained laminated all-solid-state secondary battery 10 was 5.54 mm×4.04 mm×1.04 mm. In the laminated all-solid-state secondary battery 10 obtained by Comparative Example 1, since the outer electrode was formed on the outer surface of the laminated sintered body 20, the volume was larger than those of the laminated all-solid-state secondary batteries 11 to 14 obtained by Examples 6 to 9 depending on the thickness of the outer electrode.

[Evaluation]

In the laminated all-solid-state secondary batteries manufactured by Examples 6 to 9 and Comparative Example 2, the charge and discharge capacity, the volumetric energy density, and the cycle characteristics were measured by the following method. The results are shown in Table 2 below together with the cross-sectional shapes of the positive and outer negative electrodes.

<Charge and Discharge Capacity>

The first charge and discharge capacity was measured in an environment of 25° C. In the charge capacity, a constant current of 0.1 C was applied until the cell voltage reached 1.6 V and the capacity when held for 3 hours was measured. The discharge capacity was measured by charging and then discharging at a constant current of 0.2 C until the cell voltage reached 0 V. The discharge capacity is a relative value when the discharge capacity of the laminated all-solid-state secondary battery manufactured by Comparative Example 2 is 100.

<Volumetric Energy Density>

The volumetric energy density was calculated by the following formula.

Volumetric energy density (mWh/L)=first discharge capacity (μAh)×average discharge voltage (V)÷volume (mm³) of laminated all-solid-state secondary battery Table 2 shows relative values in a state in which the discharge capacity of the laminated all-solid-state secondary battery manufactured in Comparative Example 2 is 100.

<Charge and Discharge Cycle Characteristics>

The measurement of the charge and discharge capacity was defined as one cycle and the charge and discharge capacity retention rate after repeating this up to 1000 cycles was evaluated as the charge and discharge cycle characteristics. The charge and discharge cycle characteristics in this embodiment were calculated by the following formula.

Charge and discharge capacity retention rate [%] after 1000 cycles=(discharge capacity (μAh) after 1000 cycles÷first discharge capacity (μAh))×100

TABLE 2

| | CROSS-SECTIONAL SHAPE OF OUTER ELECTRODE | PRESENCE OF BURIED ELECTRODE | FIRST DISCHARGE CAPACITY [RELATIVE VALUE] | VOLUMETRIC ENERGY DENSITY [RELATIVE VALUE] | DISCHARGE CAPACITY RETENTION RATE [%]/1000 CYCLES |
|---|---|---|---|---|---|
| COMPARATIVE EXAMPLE 2 | U-SHAPE | NO | 100 | 100 | 78 |
| EXAMPLE 6 | L-SHAPE | YES | 103 | 107 | 91 |
| EXAMPLE 7 | L-SHAPE | YES | 103 | 109 | 91 |
| EXAMPLE 8 | I-SHAPE | YES | 104 | 110 | 90 |
| EXAMPLE 9 | I-SHAPE | YES | 105 | 111 | 90 |

In the laminated all-solid-state secondary batteries of Examples 6 to 9 in which the upper end portions of the outer positive electrode 61 and the outer negative electrode 71 were on the inside (the lower side) of the upper end portion of the laminated sintered body 20 in the laminating direction, the charge and discharge capacity, the volumetric energy density, and the cycle characteristics were improved compared to the laminated all-solid-state secondary battery of Comparative Example 1.

Particularly, in the laminated all-solid-state secondary battery of Example 7 in which the lower surface sub-electrode 62a and the lower surface sub-electrode 72a were embedded in the lower surface 26 of the laminated sintered body 20, the volumetric energy density was improved. This is because the lower surface sub-electrode 62a and the lower surface sub-electrode 72a were embedded in the lower surface 26 of the laminated sintered body 20 so that the volume of the laminated all-solid-state secondary battery was smaller than that of Example 6.

INDUSTRIAL APPLICABILITY

According to the present invention, it is possible to provide a laminated all-solid-state secondary battery having excellent charge and discharge capacity, pulse discharge cycle characteristics, and cycle characteristics.

REFERENCE SIGNS LIST 310, 311, 312, 313, 314, 315 Laminated all-solid-state secondary battery
320 Laminate
321 First side surface
322 Second side surface
323 Third side surface
324 Fourth side surface
325 Upper surface
326 Lower surface
330 Positive electrode
331 Positive electrode current collector layer 332 Positive electrode active material layer
340 Negative electrode
341 Negative electrode current collector layer
342 Negative electrode active material layer
350 Solid electrolyte layer
360, 361, 362, 363, 364, 365 Outer positive electrode
360a Side surface sub-electrode
360b, 361b, 363b Upper surface sub-electrode
360c, 361c, 362c, 363c, 364c Lower surface sub-electrode
370, 371, 372, 373, 374, 375 Outer negative electrode
370a Side surface sub-electrode
370b, 371b, 373b Upper surface sub-electrode
370c, 371c, 372c, 373c, 374c Lower surface sub-electrode
10, 11, 12, 13, 14 Laminated all-solid-state secondary battery
20 Laminated sintered body
21 First side surface
21a Recess
22 Second side surface
22a Recess
23 Third side surface
24 Fourth side surface
25 Upper surface
26 Lower surface
30 Positive electrode
31 Positive electrode current collector layer
32 Positive electrode active material layer
40 Negative electrode
41 Negative electrode current collector layer
42 Negative electrode active material layer
50 Solid electrolyte layer
60, 61, 62, 63, 64 Outer positive electrode
60a, 61a, 62a Lower surface sub-electrode
60b Upper surface sub-electrode
60c Side surface sub-electrode
70, 71, 72, 73, 74 Outer negative electrode
70a, 71a, 72a Lower surface sub-electrode
70b Upper surface sub-electrode
70c Side surface sub-electrode
120 Unit laminated body
121 First side surface
122 Second side surface
123 Third side surface
124 Fourth side surface
125 Upper surface
126 Lower surface
130 Positive electrode
131 Positive electrode current collector layer
132 Positive electrode active material layer
133 Spacing portion
135 Positive electrode unit
140 Negative electrode
141 Negative electrode current collector layer
142 Negative electrode active material layer
143 Spacing portion
145 Negative electrode unit
150a, 150b, 150c Solid electrolyte layer
161 First groove
162 Second groove
163 Conductive material
164 Sub-electrode
220 Unit laminated body
225 Upper surface
226 Lower surface
230 Positive electrode
231 Positive electrode current collector layer
232 Positive electrode active material layer
233 Spacing portion
235 Positive electrode unit
240 Negative electrode
241 Negative electrode current collector layer
242 Negative electrode active material layer
243 Spacing portion
245 Negative electrode unit
250a, 250b, 250c Solid electrolyte layer
261 First groove
262 Second groove
263 Conductive material

The invention claimed is:

1. A laminated all-solid-state secondary battery comprising;
a laminated body in which a positive electrode, a negative electrode, and a solid electrolyte layer interposed therein are laminated in a lamination direction;
an outer positive electrode; and
an outer negative electrode, wherein
the laminated body has a top surface and a bottom surface, both of which are perpendicular to the lamination direction, and four side surfaces parallel to the lamination direction,
the four side surfaces are a first side surface, a second side surface, a third side surface and a fourth side surface, the first side surface and the second side surface being parallel and facing each other, the third side surface and the fourth side surface being parallel, facing each other and perpendicular to the first side surface and the second side surface,
the positive electrode and negative electrode are exposed to the first side surface and the second side surface, respectively,
the outer positive electrode and the outer negative electrode are provided on a part of the first side surface and a part of the second side surface, respectively,
the outer positive electrode and the outer negative electrode are electrically connected to the positive electrode and the negative electrode, respectively,
a part of the outer positive electrode and a part of the outer negative electrode overhung on a part of the top surface or the bottom surface in one end in the lamination direction,
the outer positive electrode and the negative electrode are free of overlapping as viewed in a direction perpendicular to the third side surface,
the outer negative electrode and the positive electrode are free of overlapping as viewed in a direction perpendicular to the third side surface,
other end of each of the outer positive electrode and the outer negative electrode in the lamination direction is indented from the top surface or the bottom surface in the lamination direction, and
the other end of each of the outer positive electrode and the outer negative electrode extends from the respective one end of the outer positive electrode and the outer negative electrode in the lamination direction without reaching the top surface or the bottom surface in the lamination direction.

2. The laminated all-solid-state secondary battery according to claim 1,
wherein an end of the outer positive electrode overhanging on the top surface or the bottom surface, and the negative electrode are free of overlapping as viewed in the lamination direction.

3. The laminated all-solid-state secondary battery according to claim 1,
wherein an end of the outer negative electrode overhanging on the top surface or the bottom surface, and the positive electrode are free of overlapping as viewed in the lamination direction.

4. The laminated all-solid-state secondary battery according to claim 1,
wherein an end of the outer positive electrode overhanging on the top surface or the bottom surface, and the negative electrode are free of overlapping as viewed in the lamination direction, and
an end of the outer negative electrode overhanging on the top surface or the bottom surface, and the positive electrode are free of overlapping as viewed in the lamination direction.

5. The laminated all-solid-state secondary battery according to claim 1,
wherein the negative electrode comprises a plurality of negative electrodes, and
an end of the outer positive electrode overhanging on the top surface or the bottom surface; and one negative electrode among the negative electrodes closest to the top surface or the bottom surface where the outer positive electrode overhang are free of overlapping as viewed in the lamination direction.

6. The laminated all-solid-state secondary battery according to claim 1,
wherein the positive electrode comprises a plurality of positive electrodes, and
an end of the outer negative electrode overhanging on the top surface or the bottom surface; and one positive electrode among the positive electrodes closest to the top surface or the bottom surface where the outer negative electrode overhang are free of overlapping as viewed in the lamination direction.

7. The laminated all-solid-state secondary battery according to claim 1,
wherein the negative electrode comprises a plurality of negative electrodes,
an end of the outer positive electrode overhanging on the top surface or the bottom surface; and one negative electrode among the negative electrodes closest to the top surface or the bottom surface where the outer positive electrode overhang are free of overlapping as viewed in the lamination direction,
the positive electrode comprises a plurality of positive electrodes, and
an end of the outer negative electrode overhanging on the top surface or the bottom surface; and one positive electrode among the positive electrodes closest to the top surface or the bottom surface where the outer negative electrode overhang are free of overlapping as viewed in the lamination direction.

8. The laminated all-solid-state secondary battery according to claim 1,
wherein the laminated all-solid-state secondary battery is obtained by sintering.

* * * * *